United States Patent
Hagiwara

(10) Patent No.: US 8,267,761 B2
(45) Date of Patent: Sep. 18, 2012

(54) STORAGE MEDIUM HAVING GAME PROGRAM STORED THEREIN AND GAME APPARATUS

(75) Inventor: Takamitsu Hagiwara, Nerima-ku (JP)

(73) Assignee: Nintendo Co., Ltd., Kyoto (JP)

( * ) Notice: Subject to any disclaimer, the term of this patent is extended or adjusted under 35 U.S.C. 154(b) by 703 days.

(21) Appl. No.: 12/471,840

(22) Filed: May 26, 2009

(65) Prior Publication Data

US 2010/0234083 A1    Sep. 16, 2010

(30) Foreign Application Priority Data

Mar. 12, 2009    (JP) ................... 2009-059455

(51) Int. Cl.
A63F 9/24    (2006.01)
(52) U.S. Cl. .............................................. 463/9; 463/43
(58) Field of Classification Search ................. 463/9, 43
See application file for complete search history.

(56) References Cited

U.S. PATENT DOCUMENTS

| | | | |
|---|---|---|---|
| 6,093,104 A | 7/2000 | Kasahara et al. | |
| 2006/0252478 A1 | 11/2006 | Eto | |
| 2007/0266181 A1 | 11/2007 | Watanabe | |
| 2008/0293469 A1* | 11/2008 | Murakoshi | 463/9 |

FOREIGN PATENT DOCUMENTS

| | | |
|---|---|---|
| JP | 2001-178967 | 7/2001 |
| JP | 2006-311933 | 11/2006 |
| JP | 2007-260116 | 10/2007 |

OTHER PUBLICATIONS

"Cleopatra Fortune", Famitsu DC, SEGA Corporation, Jul. 1, 2001, vol. 3, No. 8, $40^{th}$ issue, p. 79, 6 pages with a partial English translation.
"Mario Party DS", Famitsu DS + Wii, Enterbrain Inc., Feb. 1, 2008, vol. 10, No. 2, $104^{th}$ issue, pp. 16-17, 6 pages with a partial English translation.

* cited by examiner

Primary Examiner — Bradley K Smith
(74) Attorney, Agent, or Firm — Nixon & Vanderhye P.C.

(57) ABSTRACT

In a game apparatus, a plurality of puzzle elements each having a preset attribute are arranged within a predetermined area on the screen of a display device. A puzzle element arrangement pattern within the predetermined area is altered in accordance with a player's operation. In the game apparatus, when the arrangement pattern is altered, a ring-like puzzle element group is identified, which consists of puzzle elements having the same preset attribute and being adjacently arranged in a closed ring within the predetermine area. In the game apparatus, any puzzle element is deleted, which is arranged in a position determined by the identified ring-like puzzle element group defined by the ring-like puzzle element identification means.

31 Claims, 10 Drawing Sheets

STORAGE MEDIUM HAVING GAME PROGRAM STORED THEREIN AND GAME APPARATUS

CROSS REFERENCE TO RELATED APPLICATION

The disclosure of Japanese Patent Application No. 2009-59455, filed Mar. 12, 2009, is incorporated herein by reference.

BACKGROUND AND SUMMARY

1. Technical Field

The technology presented herein relates to storage media and game apparatuses, and more specifically to a storage medium having stored therein a game program allowing the user to play a puzzle game and an apparatus for a puzzle game.

2. Description of the Background Art

There are conventional puzzle games in which blocks or panels (herein after, referred to as "puzzle elements") arranged on the screen are moved or altered by the player's operation, and when a predetermined condition is satisfied, any puzzle element satisfying that condition is deleted (see, for example, Japanese Laid-Open Patent Publication Nos. 2001-178967 and 2006-311933, which are respectively referred to below as Patent documents 1 and 2). In the puzzle games disclosed in Patent documents 1 and 2, puzzle elements of the same type are deleted on the condition that a predetermined number or more of such elements be adjacently arranged.

In most of the conventional puzzle games, the condition (deletion condition) for deleting puzzle elements is a simple condition that "a predetermined number or more of puzzle elements of the same type be adjacently arranged", as in Patent documents 1 and 2. In the conventional puzzle games, the deletion condition is simple, and therefore, in some cases, the game itself is rendered too simple and monotonous, which in turn renders the game less strategic and so insipid.

Therefore, a feature of the example embodiment presented herein is to provide a puzzle game which is more strategic and fun.

The present embodiment has the following features to attain the above. Here, the reference numerals, the supplementary description and the like in the parentheses indicate a correspondence with the embodiment described below in order to aid in understanding the present embodiment and are not intended to limit, in any way, the scope of the present embodiment.

The present embodiment is directed to a computer-readable storage medium (memory card 29) having stored therein a game program (50) to be executed by a computer (e.g., CPU 31) in a game apparatus (1). The program causes the computer to function as puzzle element arrangement means (e.g., CPU 31 performing step S1; hereinafter, only step numbers will be indicated), arrangement alteration means (S4), ring-like puzzle element identification means (S7), and puzzle element deletion means (S9). The puzzle element arrangement means arranges a plurality of puzzle elements (pieces) within a predetermined area (field) on a screen of a display device (lower LCD 12), the elements each having a preset attribute (color). The arrangement alteration means alters a puzzle element arrangement pattern within the predetermined area in accordance with a player's operation (alteration operation). The ring-like puzzle element identification means identifies a ring-like puzzle element group consisting of puzzle elements having the same preset attribute and being adjacently arranged in a closed ring within the predetermine area. The puzzle element deletion means deletes any puzzle element (the identified ring-like piece group and any piece surrounded thereby) arranged in a position determined by the identified ring-like puzzle element group defined by the ring-like puzzle element identification means.

In the above configuration, puzzle elements are deleted on the deletion condition that "puzzle elements have the same preset attribute and be adjacently arranged in a closed ring". Accordingly, puzzle elements of one type are deleted by joining them in a loop. The deletion condition as conventionally used that "plural puzzle elements of one type are simply joined" is extremely permissive, and might cause the game itself to be too simple and less strategic. On the other hand, in the above configuration, the deletion condition is moderately complicated, which renders the game more strategic, making it possible to provide a puzzle game which is more fun.

Also, the ring-like puzzle element identification means may define as the identified ring-like puzzle element group any ring-like puzzle element group satisfying a condition that any puzzle element of the same attribute as the ring-like puzzle element group should not be arranged inside the ring-like puzzle element group.

In the above configuration, when the arrangement pattern includes any puzzle element having the same attribute as the ring-like puzzle element group and being arranged inside the ring-like puzzle element group, the deletion condition is not satisfied. Here, supposing that the deletion condition is satisfied by such an arrangement pattern, there would be a number of puzzle element groups satisfying the deletion condition within the predetermined area, which might render the game extremely easy and thereby spoil the fun of the game. Furthermore, if the deletion condition is satisfied by the above arrangement pattern, there is a possibility that more than one ring-like puzzle element group satisfy the deletion condition, and therefore a game process (or the player's operation) is required for determining which puzzle element group should be deleted. On the other hand, the present invention inhibits the deletion condition from being satisfied by the above arrangement pattern, thereby preventing the game from being extremely easy, and also preventing the game process or the player's operation from being extremely complicated.

The puzzle element arrangement means may arrange puzzle elements of plural attributes within the predetermined area. In this case, the ring-like puzzle element identification means defines as the identified ring-like puzzle element group any ring-like puzzle element group satisfying a condition (first sub-condition) that puzzle elements of only one attribute different from the ring-like puzzle element group be arranged inside the ring-like puzzle element group.

In the above configuration, puzzle elements inside the ring-like puzzle element group are required to be of one type, which increases the difficulty level of the game.

The ring-like puzzle element identification means may define as the identified ring-like puzzle element group any ring-like puzzle element group further satisfying a sub-condition (second sub-condition) that the ring-like puzzle element group should consist of as small a number of puzzle elements as possible to surround one or more puzzle elements arranged inside the ring-like puzzle element group.

In the above configuration, assuming group A consisting of adjacently arranged puzzle elements of the same attribute, there would be only one ring-like puzzle element group satisfying the deletion condition by surrounding puzzle element group A. There would be no more than one puzzle element group satisfying the deletion condition by surrounding puzzle element group A, and therefore no game process (or no player operation) is required for determining which one of two or more puzzle element groups should be deleted. Thus, with the above configuration, the game process or the player's operation can be prevented from being extremely complicated.

Also, the ring-like puzzle element identification means may include reference selection means (S21), internal puzzle element selection means (S22), and external puzzle element selection means (S24, S25). The reference selection means selects a puzzle element within the predetermined area as a reference puzzle element (reference piece, reference piece data 57). The internal puzzle element selection means selects any puzzle element of an attribute different from the reference puzzle element from among a puzzle element group only surrounding the reference puzzle element. The internal puzzle element selection means further selects as an internal puzzle element group (internal piece group, internal piece data 58) any puzzle element group including the selected puzzle element and consisting of adjacently arranged puzzle elements of an attribute different from the reference puzzle element. The external puzzle element selection means selects as an external puzzle element group (external piece group, external piece data 59) any puzzle element group only surrounding the internal puzzle element group, and defines as the identified ring-like puzzle element group any external puzzle element group consisting of puzzle elements adjacently arranged in a closed ring.

In the above configuration, a ring-like puzzle element group including a reference puzzle element can be identified by a simplified process. Specifically, an internal puzzle element group is selected based on a reference puzzle element, and an external puzzle element group is selected based on the internal puzzle element group, making it possible to identify a ring-like puzzle element group by an easy and simplified process.

Also, the puzzle element arrangement means may arrange at least first and second attribute puzzle elements within the predetermined area. In this case, for both the first and second attribute puzzle elements, the ring-like puzzle element identification means determines whether or not the puzzle elements are arranged to form their respective identified ring-like puzzle element groups.

In the above configuration, puzzle element deletion can be performed as well by creating a closed ring with puzzle elements of either of plural attributes. Therefore, the player plays the game considering whether puzzle elements of each type should be external (frame) or internal. Thus, with the above configuration, variations on the puzzle element deletion method are increased, which renders the game more strategic, making it possible to provide a puzzle game which is more fun.

Also, based on a condition that only puzzle elements of an attribute different from the ring-like puzzle element group be arranged inside the ring-like puzzle element group, the ring-like puzzle element identification means may determine as the identified ring-like puzzle element groups both a first attribute ring-like puzzle element group arranged to surround only the second attribute puzzle elements and a second ring-like puzzle element group arranged to surround only the first attribute puzzle elements.

In the above configuration, puzzle elements inside a puzzle element group adjacently arranged in a closed ring is required to be of one type, which further increases the difficulty level of the game.

Also, the game program may cause the computer to function such that the player's operation is repeatedly accepted, and the arrangement alteration means alters the puzzle element arrangement pattern within the predetermined area upon each operation by the player, thereby progressing a game. In this case, the arrangement alteration means is capable of altering the arrangement pattern upon each operation by the player, for both the first and second attribute puzzle elements.

In the above configuration, the player can perform each operation on any of the first and second attribute puzzle elements. Thus, it is possible to further improve game operability.

Also, the puzzle element deletion means may delete both the identified ring-like puzzle element group defined by the ring-like puzzle element identification means and any puzzle element arranged inside the identified ring-like puzzle element group (FIG. 5).

In the above configuration, any puzzle element in a region surrounded by a ring-like puzzle element group satisfying the deletion condition is deleted, and therefore the player can readily recognize a region from which any puzzle element to be deleted when the deletion condition is satisfied. Thus, with the above configuration, it is possible to provide a puzzle game with easy rules that is enjoyable even for beginners.

Also, the puzzle element deletion means may delete only the identified ring-like puzzle element group defined by the ring-like puzzle element identification means.

In the above configuration, any ring-like puzzle element group satisfying the deletion condition is deleted, and therefore the player can readily recognize puzzle elements to be deleted when the deletion condition is satisfied. Thus, with the above configuration, it is possible to provide a puzzle game with easy rules that is enjoyable even for beginners.

Also, the puzzle element arrangement means may arrange puzzle elements of plural attributes within the predetermined area. In this case, the game program causes the computer to further function as alteration acceptance means (S2) for accepting the player's operation of designating an alteration source puzzle element and an alteration destination puzzle element from among the puzzle elements within the predetermined area. The arrangement alteration means alters the alteration destination puzzle element so as to have the same attribute as the alteration source puzzle element, thereby altering the puzzle element arrangement pattern.

In the above configuration, the attribute of the alteration destination puzzle element is altered to the same attribute as the alteration source puzzle element, and therefore when the player desires to alter the attribute of a puzzle element to a desired attribute, it is necessary to find and designate the desired attribute from the predetermined area. Thus, with the above configuration, comparing to the player's operation of simply designating a desired attribute, the operation of altering the arrangement pattern is rendered highly enjoyable, making it possible to render the game more fun.

Also, the arrangement alteration means may cause the alteration destination puzzle element to interchange in attribute with the alteration source puzzle element, thereby altering the puzzle element arrangement pattern (FIGS. 3 and 4).

In the above configuration, the alteration destination puzzle element is caused to interchange in attribute with the alteration source puzzle element through the player's operation, and therefore the puzzle element attribute alteration simultaneously occurs at two places within the predetermined area. In this case, if the player's operation is successful, two puzzle elements can be both altered so as to have a desired attribute by that one operation, although if the operation is unsuccessful, the attribute of one puzzle element might be altered to an undesired attribute. Thus, with the above configuration, it is possible to render the player's operation more strategic, which in turn renders the game more fun.

Also, the game program may cause the computer to further function as direction acceptance means for accepting the player's operation of designating a direction within the predetermined area. In this case, the arrangement alteration means moves one or more puzzle elements in the direction designated by the player's operation, thereby altering the puzzle element arrangement pattern.

In the above configuration, the player can designate a direction to move the puzzle element, thereby readily altering the arrangement pattern.

Also, the ring-like puzzle element identification means may identify a ring-like puzzle element group including any puzzle element having its position or attribute altered by the arrangement alteration means altering the arrangement pattern (S7).

In the above configuration, when the deletion condition satisfied by the player's operation of altering the arrangement pattern, the ring-like puzzle element is deleted without any further operation by the player. Thus, the player can play the game with satisfactory operability.

Also, the game program may cause the computer to further function as designation acceptance means (S2) for accepting the player's operation (designation operation) of designating a puzzle element within the predetermined area. In this case, the ring-like puzzle element identification means identifies a ring-like puzzle element group including the designated puzzle element when the designation acceptance means accepts the player's operation of designating the puzzle element (S7).

In the above configuration, even if there is a ring-like puzzle element group originally satisfying the deletion condition, the ring-like puzzle element group is not deleted without any action unless the player designates any puzzle element included in the ring-like puzzle element group. That is, the player finds and designates a ring-like puzzle element group satisfying the deletion condition within the field, so that the player can play the puzzle game in a more enjoyable manner than conventionally.

Also, the ring-like puzzle element identification means may define a plurality of identified ring-like puzzle element groups, and the puzzle element deletion means may delete puzzle elements arranged in positions respectively determined by the identified ring-like puzzle element groups.

In the above configuration, the player can delete puzzle elements corresponding to a plurality of identified ring-like puzzle element groups through a single operation.

Also, the game program may cause the computer to further function as designation acceptance means for accepting the player's operation of designating a puzzle element within the predetermined area. In this case, the ring-like puzzle element identification means defines as the identified ring-like puzzle element group a ring-like puzzle element group surrounding the designated puzzle element when the designation acceptance means accepts the player's operation of designating the puzzle element.

In the above configuration, even if there is a ring-like puzzle element group originally satisfying the deletion condition, the ring-like puzzle element group is not deleted without any action unless the player designates any puzzle element surrounded by the ring-like puzzle element group. That is, the player finds and designates a ring-like puzzle element group satisfying the deletion condition within the field, so that the player can play the puzzle game in a more enjoyable manner than conventionally.

Also, the program may cause the computer to further function as puzzle element refilling means (S14) for refilling a puzzle element in a position from which a puzzle element has been deleted by the puzzle element deletion means.

In the above configuration, any position from which a puzzle element has been deleted is refilled with a new puzzle element, and therefore the player can continue the game with a new arrangement pattern different from that before the deletion, which renders the game more fun.

Also, the game program may cause the computer to further function as puzzle element movement means and puzzle element refilling means. The puzzle element movement means moves a puzzle element in a predetermined direction to an end of the predetermined area or until the puzzle element is placed adjacent to another puzzle element, the puzzle element to be moved being rendered out of contact with another puzzle element in the predetermined direction through puzzle element deletion by the puzzle element deletion means. The puzzle element refilling means refills a puzzle element in a region where no puzzle element is present after the movement by the puzzle element movement means.

In the above configuration, when any puzzle element is deleted, puzzle element refilling is performed after alteration of the arrangement pattern, and therefore the player can continue the game with a new arrangement pattern different from that before the deletion, which renders the game more fun.

Also, the puzzle element refilling means may refill at least two types of puzzle elements per refill.

In the above configuration, the arrangement pattern for puzzle element refilling is prevented from being monotonous, which renders the game more fun.

The puzzle element deletion means may delete a puzzle element group after a lapse of a predetermined period of time since deletion of the puzzle element group was determined. In this case, when the ring-like puzzle element identification means defines as the identified ring-like puzzle element group another ring-like puzzle element group including a part of the puzzle element group being deleted before the puzzle element group is completely deleted, the puzzle element deletion means further deletes any puzzle element arranged in a position determined by the identified ring-like puzzle element group (FIGS. 12 and 13).

In the above configuration, while a ring-like puzzle element group is being deleted, the player can use a part of the ring-like puzzle element group to delete another ring-like puzzle element group. That is, with the above configuration, it is possible to perform puzzle element deletion with a unique method of successively deleting a plurality of partially overlapping ring-like puzzle element groups. As a result, variations on the puzzle element deletion method are increased, which renders the game more fun.

Also, the game program may cause the computer to further function as first effect achievement means (S10, S12) for achieving a game effect by deleting a puzzle element group, the game effect being achieved differently based on whether or not the puzzle element group includes a part of another puzzle element group being deleted.

In the above configuration, a plurality of partially overlapping puzzle element groups are successively deleted, thereby achieving a game effect different from a regular effect, which renders the game more fun.

Also, the game program may cause the computer to further function as second effect achievement means (S10, S12) for achieving a game effect variously in accordance with the number of puzzle elements to be deleted by the puzzle element deletion means.

In the above configuration, a game effect is achieved variously in accordance with the number of puzzle elements to be deleted, making it possible to provide a puzzle game which is more fun.

Also, the game program may cause the computer to further function as third effect achievement means (S10, S12) for achieving a game effect variously in accordance with the number of predetermined player operations to be performed between two consecutive attempts at puzzle element deletion.

In the above configuration, a game effect is achieved variously in accordance with the number of operations required for puzzle element deletion, making it possible to provide a puzzle game which is more fun.

Also, the game program may cause the computer to further function as region memory means (S10) and fourth effect achievement means (S10, S12). The region memory means keeps in memory (main memory 32) of the game apparatus any region (deletion history data 60) of the predetermined area from which any puzzle element has been deleted after a predetermined time point. The fourth effect achievement means achieves a predetermined game effect when the region kept in the memory satisfies a predetermined condition.

In the above configuration, the player is required to perform game operations considering regions from which any puzzle element has been deleted, which renders the game more strategic. Thus, it is possible to provide a puzzle game which is more fun.

Also, the game apparatus may include an input device (touch panel 13) for allowing designation of an arbitrary position on the screen. In this case, the arrangement alteration means alters the puzzle element arrangement pattern in accordance with the player's operation performed on the input device.

In the above configuration, the player can perform a game operation by designating a position on the screen, which renders the game operation easier and improves game operability. The input device is useful particularly in performing a game operation of designating a puzzle element within the predetermined area.

Also, the game program may cause the computer to function as puzzle element alteration means in place of the puzzle element deletion means. The puzzle element alteration means alters the attribute of any puzzle element arranged in a position determined by the identified ring-like puzzle element group defined by the ring-like puzzle element identification means.

In the above configuration, the deletion condition for altering the attribute of a ring-like puzzle element group is rendered moderately complicated as in the case of deleting a puzzle element, which renders the puzzle game more strategic, making it possible to provide a puzzle game which is more fun.

Also, the present embodiment may be provided in the form of a game apparatus having functions equivalent to those of the game apparatus as described above. Note that in this game apparatus, the aforementioned means may be realized by a CPU executing a game program, or part or all of the aforementioned means may be realized by specialized circuits included in the game apparatus.

As described above, in the present embodiment, the condition that "puzzle elements of one type be adjacently arranged in a ring" is employed as a deletion condition for deleting puzzle elements in the puzzle game, thereby rendering the deletion condition moderately difficult. Thus, it is possible to render the game more strategic, making it possible to provide a puzzle game which is more fun.

These and other features, aspects and advantages of the present embodiment will become more apparent from the following detailed description of the present embodiment when taken in conjunction with the accompanying drawings.

DESCRIPTION OF THE PREFERRED EMBODIMENTS

Hardware Configuration of the Game Apparatus

A game program and game apparatus according to an embodiment will be described with reference to the drawings. While the present embodiment can be achieved by the present program being executed in any computer system capable of displaying a game image on a display device, the present embodiment will be described with respect to the case where a game apparatus 1 shown in FIG. 1 is used as an example of the game apparatus.

Figure 1:
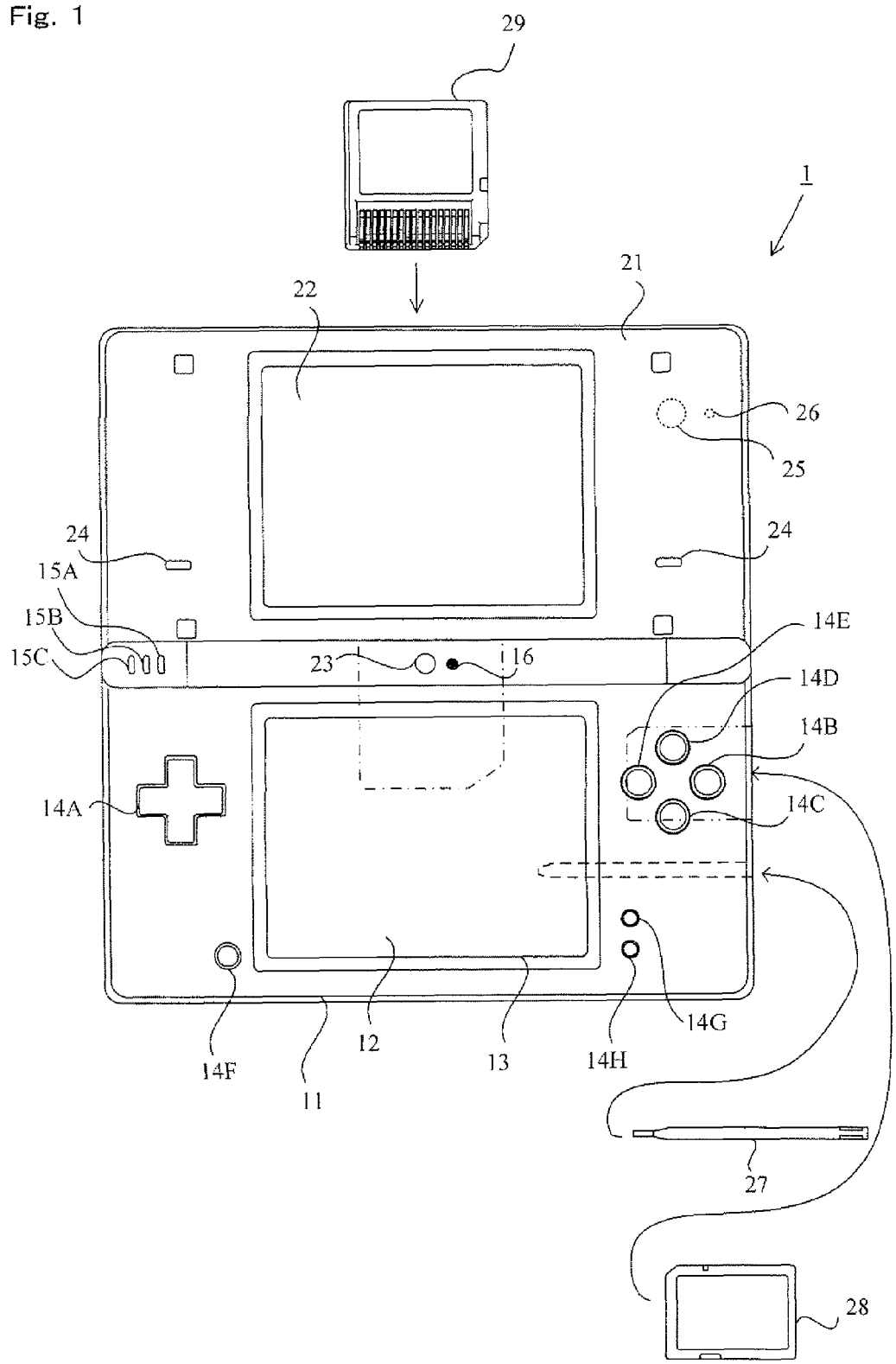
FIG. 1 is an external view of a game apparatus for executing a game program according to an embodiment.

FIG. 1 is an external view of the game apparatus 1 for executing a game program according to the present embodiment. Here, a hand-held game apparatus is shown as an example of the game apparatus 1. Note that the game apparatus 1 includes a camera and functions as an imaging device for taking an image with the camera, displaying the taken image on the screen, and storing data for the taken image.

In FIG. 1, the game apparatus 1 is a foldable hand-held game apparatus, and the game apparatus 1 shown in the figure is unfolded (open state). The game apparatus 1 is structured in a size allowing the user to hold it with both hands, or even one hand, when unfolded.

The game apparatus 1 has a lower housing 11 and an upper housing 21. The lower housing 11 and the upper housing 21 are connected so as to be openable/closable (foldable). In the example of FIG. 1, the lower housing 11 and the upper housing 21 are each formed in the shape of a horizontally elongated rectangular plate, an connected so as to be pivotable at their common long side joint. Typically, the user uses the game apparatus 1 in open state. Also, when the user does not use the game apparatus 1, the game apparatus 1 is stored in closed state. In addition, in the example shown in FIG. 1, the game apparatus 1 can maintain not only the closed and open states but also its opening state via friction force generated at the joint at any angle that can be made by the lower housing 11 and the upper housing 21 between the closed and open states. That is, the upper housing 21 can remain stationary at an arbitrary angle with respect to the lower housing 11.

The lower housing 11 is provided with a lower LCD (Liquid Crystal Display) 12. The lower LCD 12 is horizontally long, and is arranged such that its longitudinal direction coincides with the longitudinal direction of the lower housing 11. Note that in the present embodiment, LCDs are used as display devices to be included in the game apparatus 1, but any other display devices, such as EL (Electro Luminescence) display devices, may be used. In addition, display devices of any resolution can be used for the game apparatus 1. Note that an image being taken by an internal camera 23 or an external camera 25 is displayed in real-time on lower LCD 12.

The lower housing 11 is provided with various operation buttons 14A to 14K and a touch panel 13 as input devices. As shown in FIG. 1, of all the operation buttons 14A to 14K, the direction input button 14A, the operation button 14B, the operation button 14C, the operation button 14D, the operation button 14E, the power button 14F, the start button 14G, and the select button 14H are provided at the inner principal surface of the lower housing 11, which is placed on the interior side when the upper housing 21 and the lower housing 11 are folded. In the example shown in FIG. 1, the direction input button 14A and the power button 14F are provided to the left or right (in FIG. 1, to the left) of the lower LCD 12 provided at the center of the inner principal surface of the lower housing 11. In addition, the operation buttons 14B to 14E, the start button 14G, and the select button 14H are provided to the opposite side (in FIG. 1, to the right) of the lower LCD 12 on the inner principal surface of the lower housing 11. The direction input button 14A, the operation buttons 14B to 14E, the start button 14G, and the select button 14H are used for various operations on the game apparatus 1. For example, the direction input button 14A is used for selection operations and so on. The operation buttons 14B to 14K are used for setting and cancellation operations and so on. The power button 14F is used for turning ON/OFF the game apparatus 1.

Note that in FIG. 1, the operation buttons 14I to 14K are not shown. For example, the L button 14T is provided at the left edge of the upper surface of the lower housing 11, and the R button 14J is provided at the right edge of the upper surface of the lower housing 11. For example, the L button 14I and the R button 14J are used for imaging instruction operations (shutter operations) on the game apparatus 1 having an imaging function. Furthermore, the volume button 14K is provided at the left side surface of the lower housing 11. The volume button 14K is used for controlling the volume of a speaker included in the game apparatus 1.

Also, in addition to the operation buttons 14A to 14K, the game apparatus 1 further includes another input device, a touch panel 13 allowing designation of an arbitrary point on the screen. The touch panel 13 is attached so as to cover the screen of the lower LCD 12. Note that in the present embodiment, the touch panel 13 is, for example, of a resistive film type. However, the touch panel 13 is not limited to the resistive film type, and may be of any type. Also, in the present embodiment, for example, the touch panel 13 has the same resolution (detection accuracy) as the lower LCD 12. However, the touch panel 13 is not necessarily required to be equal in resolution to the lower LCD 12. In addition, the lower housing 11 has an insertion opening (in FIG. 1, indicated by broken lines) provided in its right side surface. The insertion opening can store a touch pen 27 to be used for operating the touch panel 13. Note that any input to the touch panel 13 is normally performed with the touch pen 27, but the touch pen 27 is not restrictive, and the touch panel 13 can be operated with the user's finger.

Also, the lower housing 11 has provided in the right side surface an insertion opening (in FIG. 1, indicated by two-dot chain lines) for storing a memory card 28. The insertion opening has provided therein a connector (not shown) for electrically connecting the game apparatus 1 and the memory card 28. The memory card 28 is, for example, an SD (Secure Digital) memory card removably attached to the connector. For example, the memory card 28 is used for storing (saving) images taken by the game apparatus 1 and reading into the game apparatus 1 images generated by other apparatuses.

Furthermore, the lower housing 11 has provided in its upper side surface an insertion opening (in FIG. 1, indicated by one-dot chain lines) for storing a memory card 29. This insertion opening also has provided therein a connector (not shown) for electrically connecting the game apparatus 1 and the memory card 29. The memory card 29 is a storage medium having a game program or suchlike stored therein, and is removably loaded into the insertion opening provided in the lower housing 11.

Three LEDs 15A to 15C are provided to the left of the joint between the lower housing 11 and the upper housing 21. Here, the game apparatus 1 is capable of wirelessly communicating with other equipment, and the first LED 15A is lit up while the game apparatus 1 is ON. The second LED 15B is lit up while the game apparatus 1 is being charged. The third LED 15C is lit up when wireless communication is established. Accordingly, the three LEDs 15A to 15C allow the user to know the statuses of the game apparatus 1, regarding ON/OFF of the power supply, battery charge, and communications.

On the other hand, the upper housing 21 is provided with an upper LCD 22. The upper LCD 22 is horizontally long, and is arranged such that its longitudinal direction coincides with the longitudinal direction of the upper housing 12. Note that as in the case of the lower LCD 12, any display device of any other type and resolution may be used instead of the upper LCD 22. Note that a touch panel may be provided over the upper LCD 22. The upper LCD 22 displays, for example, an operation instruction screen for teaching the user about the roles of the operation buttons 14A to 14K and the touch panel 13.

Also, the upper housing 21 is provided with two cameras (an internal camera 23 and an external camera 25). As shown in FIG. 1, the internal camera 23 is provided at the inner principal surface close to the joint of the upper housing 21. On the other hand, the external camera 25 is provided opposite to the side of the inner principal surface where the internal camera 23 is provided, i.e., the external principal surface of the upper housing 21 (the exterior surface of the game apparatus 1 in closed state; the back of the upper housing 21 shown in FIG. 1). Note that in FIG. 1, the external camera 25 is indicated by a broken circle. As a result, the internal camera 23 can take images of the direction in which the inner principal surface of the upper housing 21 is oriented, while the external camera 25 can take images of the direction opposite to the imaging direction of the internal camera 23, i.e., the direction in which the external principal surface of the upper housing 21 is oriented. In this manner, in the present embodiment, the two cameras, i.e., the internal and external cameras 23 and 25, are provided so as to take images in their respective directions opposite to each other. For example, the user can use the internal camera 23 to take images of a view from the game apparatus 1 toward the user, and also can use the external camera 25 to take images of a view in the opposite direction, i.e., from the user toward the game apparatus 1.

Note that a microphone (microphone 43 shown in FIG. 2) is provided as an audio input device under the inner principal surface close to the joint. In addition, a microphone hole 16 is provided in the inner principal surface close to the joint such that the microphone 43 can sense sound from outside the game apparatus 1. The microphone 43 and the microphone hole 16 are not necessarily required to be positioned at the joint. For example, the microphone 43 may be accommodated within the lower housing 11, and the microphone hole 16 may be provided in the lower housing 11 at a position corresponding to the position where the microphone 43 is accommodated.

Also, a fourth LED 26 (in FIG. 1, indicated by a broken circle) is provided at the external principal surface of the upper housing 21. The fourth LED 26 is lit up at the time the internal camera 23 or the external camera 25 takes an image (when the shutter button is pressed). Furthermore, the light is on while the internal camera 23 or the external camera 25 is taking a motion picture. As such, the fourth LED 26 allows any subject and bystander to know the game apparatus 1 took (or is taking) a picture.

Also, a sound hole 24 is provided to both the left and the right of the upper LCD 22 provided at the center of the inner principal surface of the upper housing 21. A speaker is accommodated within the upper housing 21 below each sound hole 24. The sound hole 24 is a hole for emanating the sound from the speaker to the outside of the game apparatus 1.

As described above, the upper housing 21 is provided with the internal and external cameras 23 and 25 configured to take images, as well as the upper LCD 22 acting as a display means for mainly displaying the operation instruction screen. On the other hand, the lower housing 11 is provided with the input devices (the touch panel 13 and the operation buttons 14A to 14K) for operational inputs to the game apparatus 1, and the lower LCD 12 acting as a display means for displaying taken images. Accordingly, when using the game apparatus 1, the user can see a taken image (an image taken by the camera) displayed on the lower LCD 12 and make inputs via the input devices while holding the lower housing 11.

Figure 2:
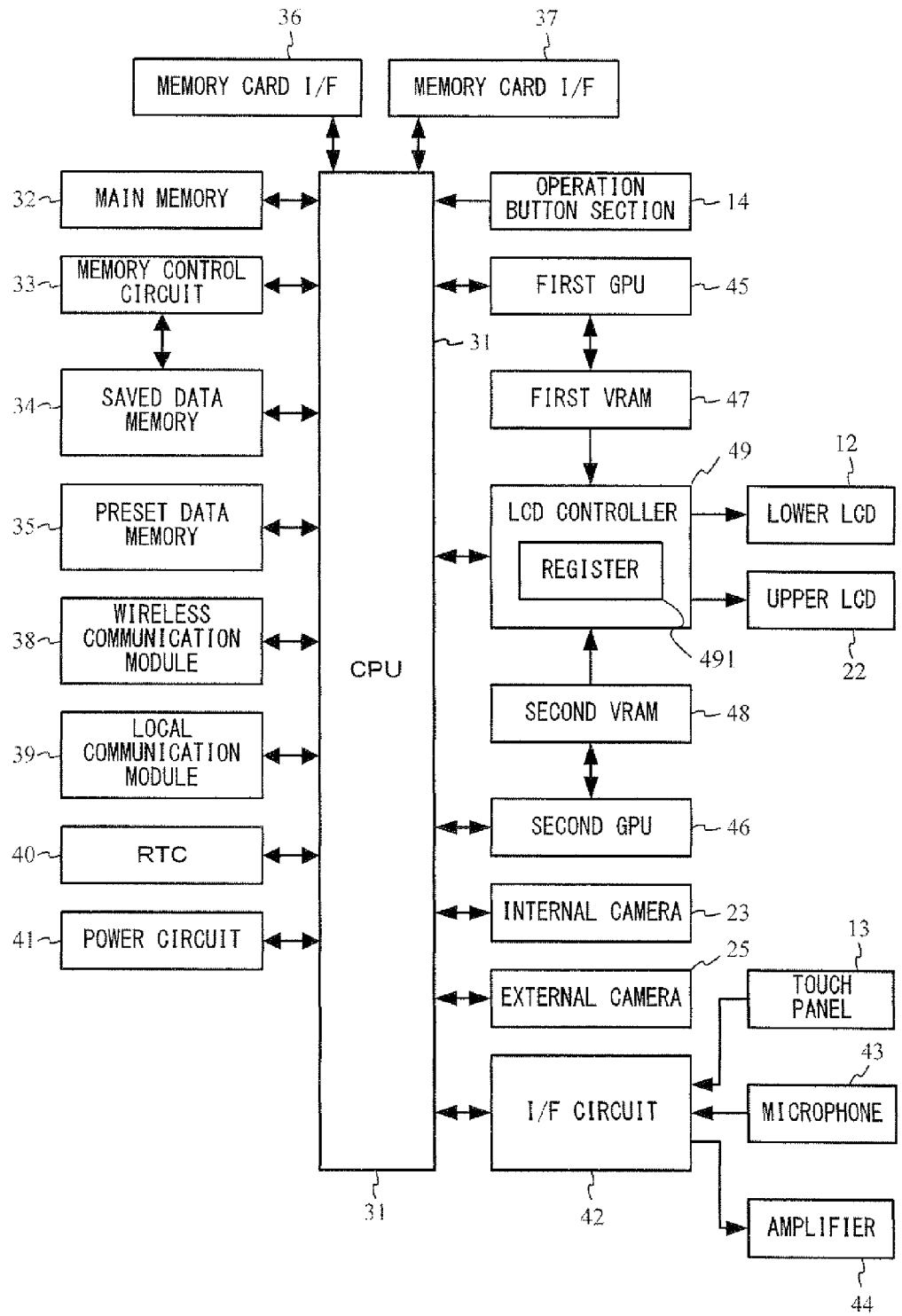
FIG. 2 is a block diagram illustrating an exemplary internal configuration of the game apparatus.

Next, an internal configuration of the game apparatus 1 will be described with reference to FIG. 2. FIG. 2 is a block diagram illustrating an exemplary internal configuration of the game apparatus 1.

In FIG. 2, the game apparatus 1 includes electronic parts, such as a CPU 31, a main memory 32, a memory control circuit 33, a saved data memory 34, a preset data memory 35, a memory card interface (memory card I/F) 36, a memory card I/F 37, a wireless communication module 38, a local communication module 39, a real time clock (RTC) 40, a power circuit 41, an interface circuit (I/F circuit) 42, a first GPU (Graphics Processing Unit) 45, a second GPU 46, a first VRAM (Video RAM) 47, a second VRAM 48, and an LCD controller 49. These electronic parts are mounted on an electronic circuit board, and accommodated within the lower housing 11 (or may be accommodated within the upper housing 21).

The CPU 31 is an information processing means for executing a predetermined program (here, a game program according to the present embodiment). In the present embodiment, the game program is stored in a memory (e.g., saved data memory 34) within the game apparatus 1 as well as in the memory card 28 and/or 29, and the CPU 3L executes the game program, thereby executing a game process to be described later. Note that the program to be executed by the CPU 31 may be prestored in the memory within the game apparatus 1 or may be acquired from the memory card 28 and/or 29 or from other equipment through communication therewith.

The CPU 31 is connected to the main memory 32, the memory control circuit 33, and the preset data memory 35. The memory control circuit 33 is connected to the saved data memory 34. The main memory 32 is a storage means used as a working area or buffering area for the CPU 31. Specifically, the main memory 32 stores various data to be used in the game process, and programs acquired from outside (e.g., the memory cards 28 and 29 and other equipment). In the present embodiment, for example, a PSRAM (Pseudo-SRAM) is used as the main memory 32. The saved data memory 34 is a storage means for storing, for example, the programs to be executed by the CPU 31 and data for images taken by the internal camera 23 and the external camera 25. The saved data memory 34 is configured by a nonvolatile storage medium, e.g., in the present embodiment, a NAND flash memory. The memory control circuit 33 is a circuit for controlling data reading from/writing to the saved data memory 34 in accordance with an instruction by the CPU 31. The preset data memory 35 is a storage means for storing data (preset data) such as various present parameters for the game apparatus 1. As for the preset data memory 35, a flash memory connected to the CPU 31 via an SPI (Serial Peripheral Interface) bus can be used.

The memory card I/Fs 36 and 37 are each connected to the CPU 31. The memory card I/F 36 reads/writes data from/to the memory card 28 attached to the connector in accordance with an instruction from the CPU 31. Also, the memory card I/F 37 reads/writes data from/to the memory card 29 attached to the connector in accordance with an instruction from the CPU 31. In the present embodiment, image data taken by the internal camera 23 and the external camera 25, as well as image data received from other devices are written into the memory card 28, and image data stored in the memory card 28 is read from the memory card 28 and stored to the saved data memory 34 or transmitted to other devices. In addition, various programs stored in the memory card 29 are read and executed by the CPU 31.

Note that the game program of the present invention may be supplied to a computer system not only via an external storage medium, such as the memory card 29, but also via a wired or wireless communication line. Also, the game program may be pre-recorded to a nonvolatile storage device within the computer system. Note that the information storage medium for storing the game program is not limited to the nonvolatile storage device, and may be a CD-ROM, a DVD, or a similar optical disk storage medium.

The wireless communication module 38 has a function of connecting to a wireless LAN in accordance with a system complying with, for example, the IEEE802.11.b/g standard. Also, the local communication module 39 has a function of wirelessly communicating with similar game apparatuses in accordance with a predetermined communication system. The wireless communication module 38 and the local communication module 39 are connected to the CPU 31. The CPU 31 is capable of transmitting/receiving data to/from other equipment via the Internet using the wireless communication module 38, as well as transmitting/receiving data to/from other similar game apparatuses via the Internet using the local communication module 39.

The CPU 31 is also connected to the RTC 40 and the power circuit 41. The RTC 40 counts time and provides an output to the CPU 31. For example, the CPU 31 can calculate the current time (date) based on the time counted by the RTC 40. The power circuit 41 controls power supplied from the power supply (typically, a battery accommodated in the lower housing 11) provided in the game apparatus 1, and supplies power to various parts of the game apparatus 1.

The game apparatus 1 is also provided with the microphone 43 and an amplifier 44. The microphone 43 and the amplifier 44 are each connected to the I/F circuit 42. The microphone 43 senses the voice of the user speaking to the game apparatus 1, and outputs an audio signal representing the voice to the I/F circuit 42. The amplifier 44 amplifies the audio signal from the I/F circuit 42 to provide an output from the speaker (not shown). The I/F circuit 42 is connected to the CPU 31.

Also, the touch panel 13 is connected to the I/F circuit 42. The I/F circuit 42 includes an audio control circuit for controlling the microphone 43 and the amplifier 44 (speaker), and a touch panel control circuit for controlling the touch panel 13. The audio control circuit performs A/D conversion and D/R conversion on the audio signal, and also converts the audio signal into audio data of a predetermined format. The touch panel control circuit generates touch point data of a predetermined format based on a signal from the touch panel 13, and outputs the generated data to the CPU 31. For example, the touch point data is data representing coordinates of a point at which an input was made to the input screen of the touch panel 13. Note that the touch panel control circuit performs reading of a signal from the touch panel 13 and generation of touch point data once every predetermined period of time. The CPU 31 can obtain the point at which an input was made to the touch panel 13 by acquiring the touch point data via the I/F circuit 42.

The above described operation buttons 14A to 14K constitute an operation button section 14 connected to the CPU 31. The operation button section 14 outputs to the CPU 31 operation data representing the status of input to the operation buttons 14A to 14K (whether or not the buttons have been pressed). The CPU 31 acquires the operation data from the operation button section 14, and executes a process in accordance with an input to the operation button section 14.

The internal camera 23 and the external camera 25 are each connected to the CPU 31. The internal camera 23 and the external camera 25 each take an image in accordance with an instruction from the CPU 31, and output data for the taken image to the CPU 31. In the present embodiment, the CPU 31 instructs either the internal camera 23 or the external camera 25 to perform imaging, and the camera instructed to perform imaging takes an image and transmits image data to the CPU 31.

The first CPU 45 is connected to the first VRAM 47, and the second GPU 46 is connected to the second VRAM 48. In accordance with an instruction from the CPU 31, the first GPU 45 generates a first display image based on display image generation data stored in the main memory 32, and creates an image on the first VRAM 47. In accordance with an instruction from the CPU 31, the second GPU 46 generates a second display image, and creates an image on the second VRAM 48, as in the case of the first GPU 45. The first VRAM 47 and the second VRAM 48 are connected to the LCD controller 49.

The LCD controller 49 includes a register 491. The register 491 stores the value of 0 or 1 in accordance with an instruction from the CPU 31. When the value in the register 491 is 0, the LCD controller 49 outputs the first display image created on the first VRAM 47 to the lower LCD 12, and also outputs the second display image created on the second VRAM 48 to the upper LCD 22. Alternatively, when the value in the register 491 is 1, the LCD controller 49 outputs the first display image created on the first VRAM 47 to the upper LCD 22, and also outputs the second display image created on the second VRAM 48 to the lower LCD 12. For example, the CPU 31 is capable of causing the lower LCD 12 to display an image acquired from either the internal camera 23 or the external camera 25, while causing the upper LCD 22 to display an operation instruction screen generated by a predetermined process.

[Outline of the Game Process]

Next, the game process to be executed by the game program according to the present embodiment will be outlined with reference to FIGS. 3 to 15. This game process is a game process for a puzzle game to be played with the goal of deleting puzzle elements displayed within a predetermined area on the screen of the display device.

Figure 3:
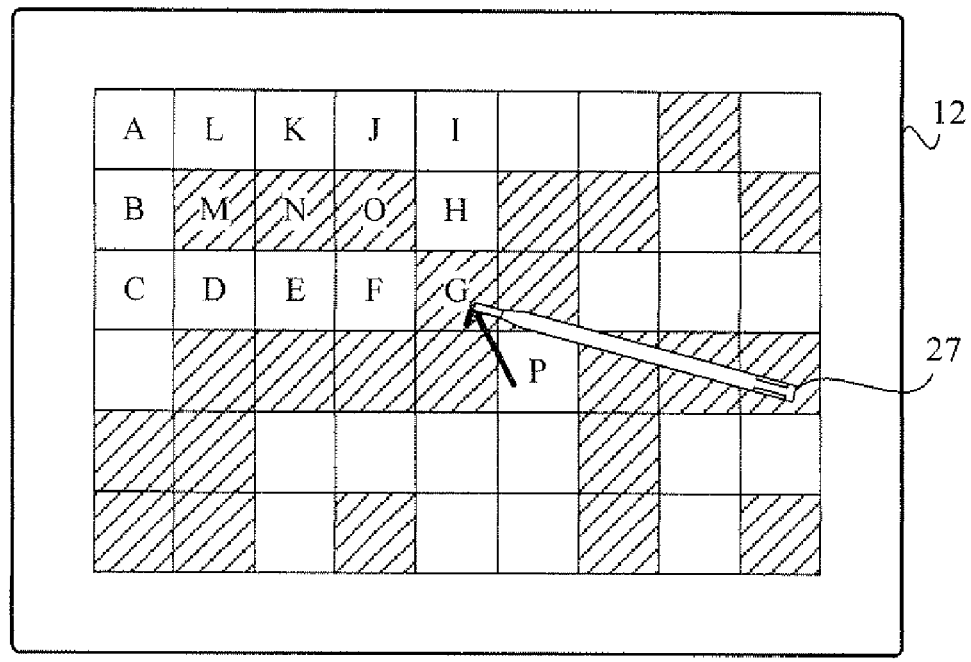
FIG. 3 is a diagram illustrating an exemplary game image in the embodiment.

FIG. 3 is a diagram illustrating an exemplary game image in the present embodiment. Note that the game image shown in FIG. 3 includes some pieces assigned symbols from "A" to "P" for description, but an actual game image to be displayed does not include these symbols (the same applies to game images shown in FIG. 4 and subsequent figures).

As shown in FIG. 3, in the game apparatus 1, a plurality of puzzle elements (pieces) each having a preset attribute are arranged within a predetermined area (field) on the screen of the lower LCD 12 (step S1 to be described later). In the present embodiment, a plurality (in FIG. 3, 54) of white or black rectangular pieces are arranged in the form of a grid. In the present embodiment, rectangular pieces are used as puzzle elements, but in another embodiment, other shapes or characters mimicking, for example, people or animals may be used as puzzle elements. Here, the "puzzle element" is called a "block" or "piece" in general puzzle games, and refers to a part of a graphic (design) having its arrangement pattern to be altered by the player's operation. Also, in the present embodiment, pieces are arranged in the form of a rectangular grid, but they may be arranged in the form of a hexagonal grid.

Also, in the present embodiment, two types of pieces different in attribute (color) are displayed with one type being in white and the other being in black (hatched in the figures). The "attribute (of a piece)" is, for example, a color, shape, or pattern (design) of the piece, which is set for the piece to be visually distinguishable regarding its type. In the present embodiment, a color is set as the attribute of a piece, and varies between types of the piece, but in another embodiment, a shape or pattern may be set so as to vary between types of the piece. Also, in the present embodiment, pieces are classified into two types, but they may be classified into three or more types.

In the present embodiment, the player can perform an alteration operation (and a designation operation to be described later). The alteration operation is an operation to alter the arrangement pattern of pieces within a field. In the present embodiment, the alteration operation is performed by specifying an alteration source piece and an alteration destination piece using the touch panel 13. Specifically, the player performs the alteration operation by drawing on the input screen of the touch panel 13 a trajectory starting at a point on the alteration source piece (in FIG. 3, piece P) and ending at a point on the alteration destination piece (in FIG. 3, piece G), as shown in FIG. 3.

Figure 4:
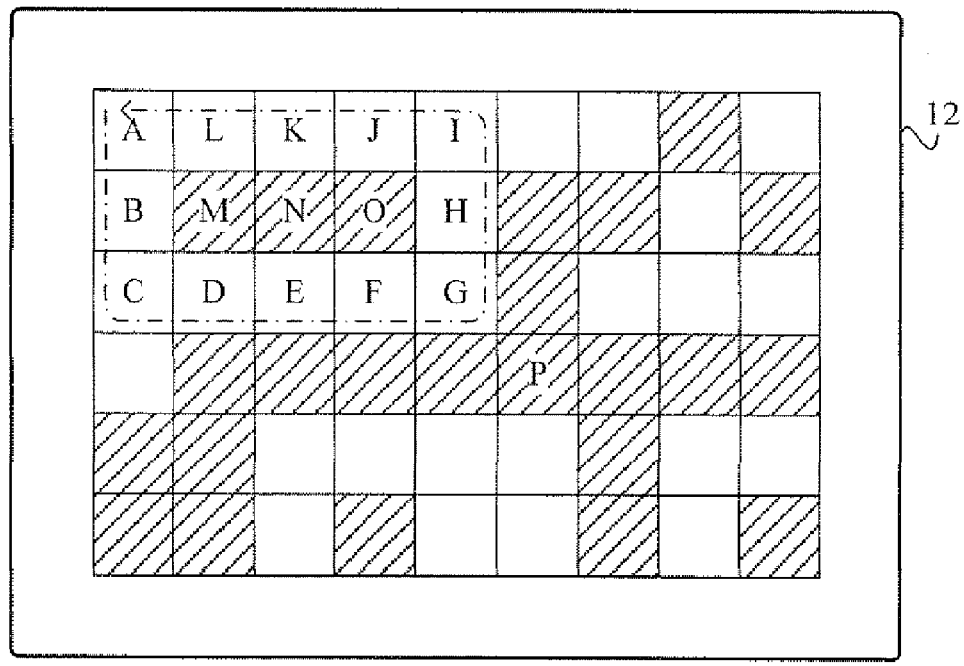
FIG. 4 is a diagram illustrating the game image shown in FIG. 3 with an altered piece arrangement pattern.

When an alteration operation is performed, the game apparatus 1 alters the arrangement pattern of pieces within a field in accordance with the alteration operation (step S4 to be described later). FIG. 4 is a diagram illustrating the game image shown in FIG. 3 with an altered piece arrangement pattern. When an alteration operation is performed for the arrangement pattern shown in FIG. 3, alteration source piece P interchanges in attribute with alteration destination piece G, as shown in FIG. 4. As a result, piece P turns black, and piece G turns white. As such, in the present embodiment, the alteration operation causes an alteration source piece to interchange in attribute with an alteration destination piece. The player performs the alteration operation as necessary to obtain a desired piece arrangement pattern.

Also, in the game apparatus 1, a piece group satisfying a deletion condition is identified in response to the alteration operation (step S7 to be described later). The "deletion condition" is a condition for deleting pieces. In the present embodiment, the deletion condition includes at least a sub-condition that "group elements have the same attribute, and be adjacently arranged in a closed ring". Specifically, in the present embodiment, the deletion condition is satisfied by pieces of one color forming a "frame" by which pieces of the other color are surrounded. For example, in the arrangement pattern of pieces shown in FIG. 4, a piece group consisting of pieces A to L satisfies the deletion condition (see one-dot chain lines shown in FIG. 4). Therefore, in the game apparatus 1, the piece group consisting of pieces A to L is identified as "a piece group satisfying the deletion condition". Hereinafter, a piece group being arranged in a ring to satisfy the deletion condition may be referred to as a "ring-like piece group", and furthermore, any ring-like piece group identified in the game apparatus 1 may be referred to as an "identified ring-like piece group". Note that as will be described in detail, the deletion condition may include any sub-condition, along with the aforementioned sub-condition.

Here, when pieces are arranged in a rectangular grid as in the present embodiment, the wording "(two) adjacent pieces" can be construed to mean either the case where two pieces lie side by side in the vertical or horizontal direction of the grid or the case where two pieces lie side by side in the vertical, horizontal, or even orthogonal direction of the grid. Unless the direction is specified herein, the wording "(two) adjacent pieces" is intended to mean that two pieces lie side by side in the vertical or horizontal direction of the grid.

Figure 5:
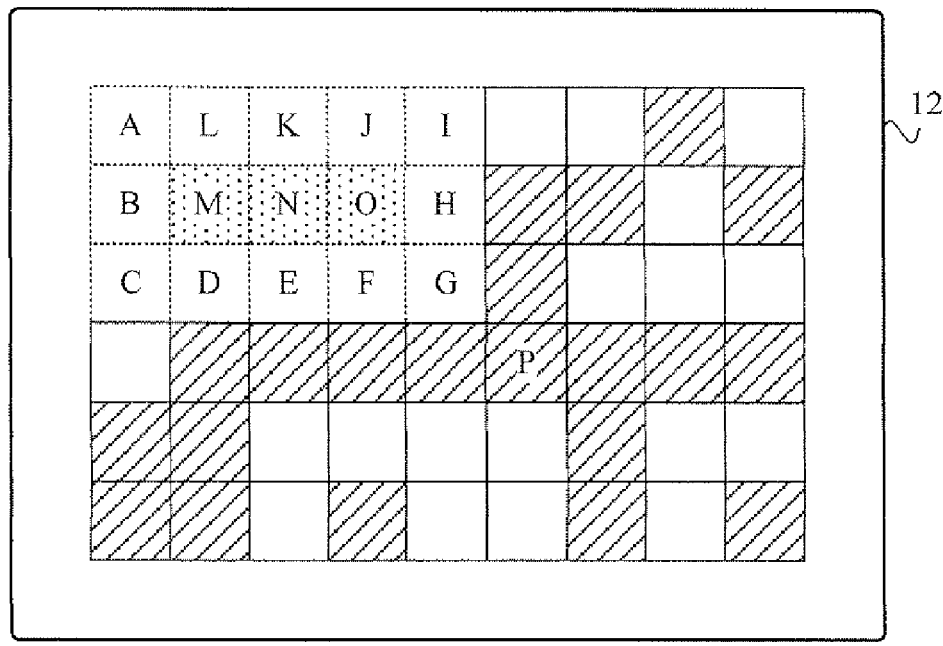
FIG. 5 is a diagram illustrating how pieces are deleted from the state shown in FIG. 4.

Referring to FIG. 4, in the game apparatus 1, when a ring-like piece group is identified, the ring-like piece group and pieces surrounded by the ring-like piece group (pieces arranged inside the ring-like piece group) are deleted. FIG. 5 is a diagram illustrating how pieces are deleted from the state shown in FIG. 4. In the game apparatus 1, pieces A to L are identified to become an identified ring-Like piece group as shown in FIG. 4, the identified ring-like piece group (pieces A to L) and pieces arranged inside the identified ring-like piece group (pieces M, N, and O) are deleted as shown in FIG. 5. As will be described in detail later, in the present embodiment, pieces will be deleted gradually over a predetermined period of time (approximately several seconds).

In the present embodiment, points are scored by deleting pieces as described above. Also, when any pieces are deleted, new pieces refill the region from which the pieces have been deleted (step S14 to be described later). In the present puzzle game, players compete for high scores obtained by the end of the game by performing alteration operations (and designation operations to be described later) with a view to deleting as many pieces as possible within a predetermined time limit from the start of the game.

As described above, in the present embodiment, the condition that "pieces of one type be ring-like (forming a frame)" is employed as a deletion condition for deleting puzzle elements (pieces) in the puzzle game. Specifically, in the present puzzle game, pieces of one type are deleted by jointing them in a ring. Here, the deletion condition as conventionally used that "plural pieces of one type are simply joined" is excessively easy, and might cause the game itself to be too simple and less strategic. On the other hand, in the present embodiment, the employed deletion condition is moderately difficult as described above, which renders the game more strategic, making it possible to provide a puzzle game which is more fun.

Also, in the present embodiment, the player can perform the designation operation in addition to the alteration operation. The designation operation is an operation of designating one piece arranged in the field. Here, in the present embodiment, for example, the initial arrangement might include any ring-like piece group satisfying the deletion condition within the field, or a ring-like piece group might satisfy the deletion condition by piece refilling. As will be described in detail, in the present embodiment, even in such a case, the ring-like piece group is not deleted without any action (without the player's operation). Therefore, in the present embodiment, the ring-like piece group satisfying the deletion condition might not be deleted and might be left in the field. The designation operation is an operation of deleting such a ring-like piece group satisfying the deletion condition, if any.

Figure 6:
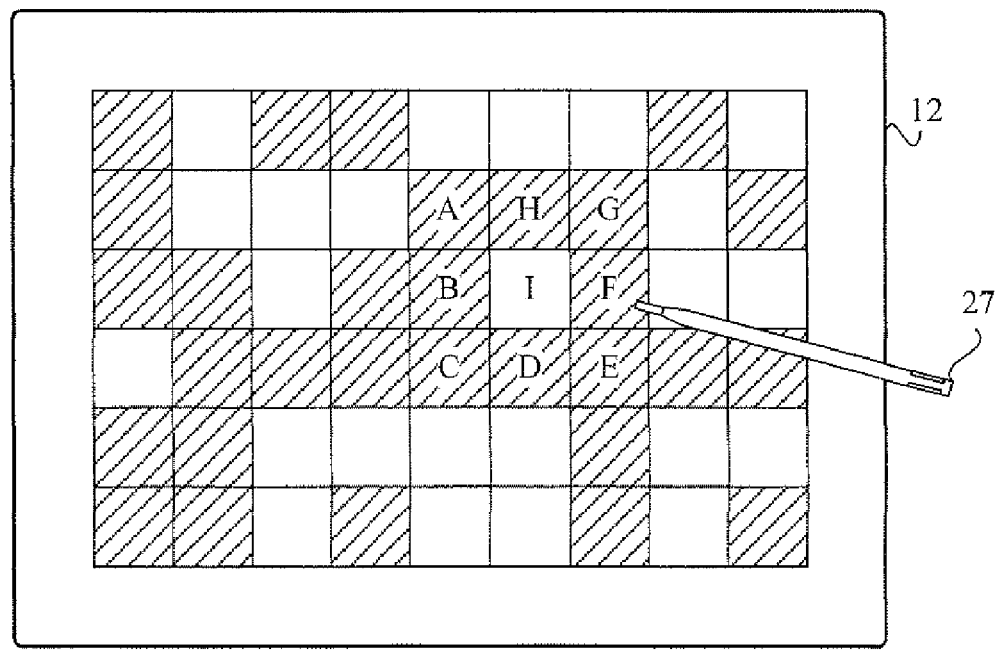
FIG. 6 is a diagram illustrating how a designation operation is performed.

FIG. 6 is a diagram illustrating how the designation operation is performed. In FIG. 6, pieces A to H satisfying the deletion condition are present without being deleted. In this case, the player performs an operation of designating any of the pieces A to H (in FIG. 6, piece F). Concretely, the player touches the piece as shown in FIG. 6.

In the game apparatus 1, a piece group satisfying the deletion condition is identified (step S7 to be described later) in response to the designation operation, as in the case of the alteration operation. As a result, for example, a ring-like piece group including pieces designated by the player and satisfying the deletion condition, such as pieces A to H shown in FIG. 6, is recognized as an identified ring-like piece group. Thereafter, as in the case of the alteration operation, the identified ring-like piece group (in FIG. 6, pieces A to H) and any piece positioned inside the identified ring-like piece group (in FIG. 6, piece I) are deleted.

As described above, in the present embodiment, any ring-like piece group initially arranged to satisfy the deletion condition is not deleted without any action, and the ring-like piece group is deleted by the player performing the designation operation on the ring-like piece group. Here, in the present embodiment, the deletion condition that "pieces of one type be ring-shaped" is employed, which is complicated compared to those in conventional games. Therefore, even if there is a ring-like piece group originally satisfying the deletion condition within the field, it is conceivably not easy for the player to find such a ring-like piece group. Accordingly, finding any ring-like piece group satisfying the deletion condition is also an aspect of the game, so that the player can find it enjoyable to discover such a ring-like piece group. That is, in the present embodiment employing the more complicated deletion condition compared to those in conventional games, the fun of "finding any piece group satisfying the deletion condition (by designation through the designation operation)" is added to the fun of "forming any piece group satisfying the deletion condition (through the alteration operation)", so that the player can play the puzzle game in a more enjoyable manner than conventionally.

[Details of the Game Process]

Figure 7:
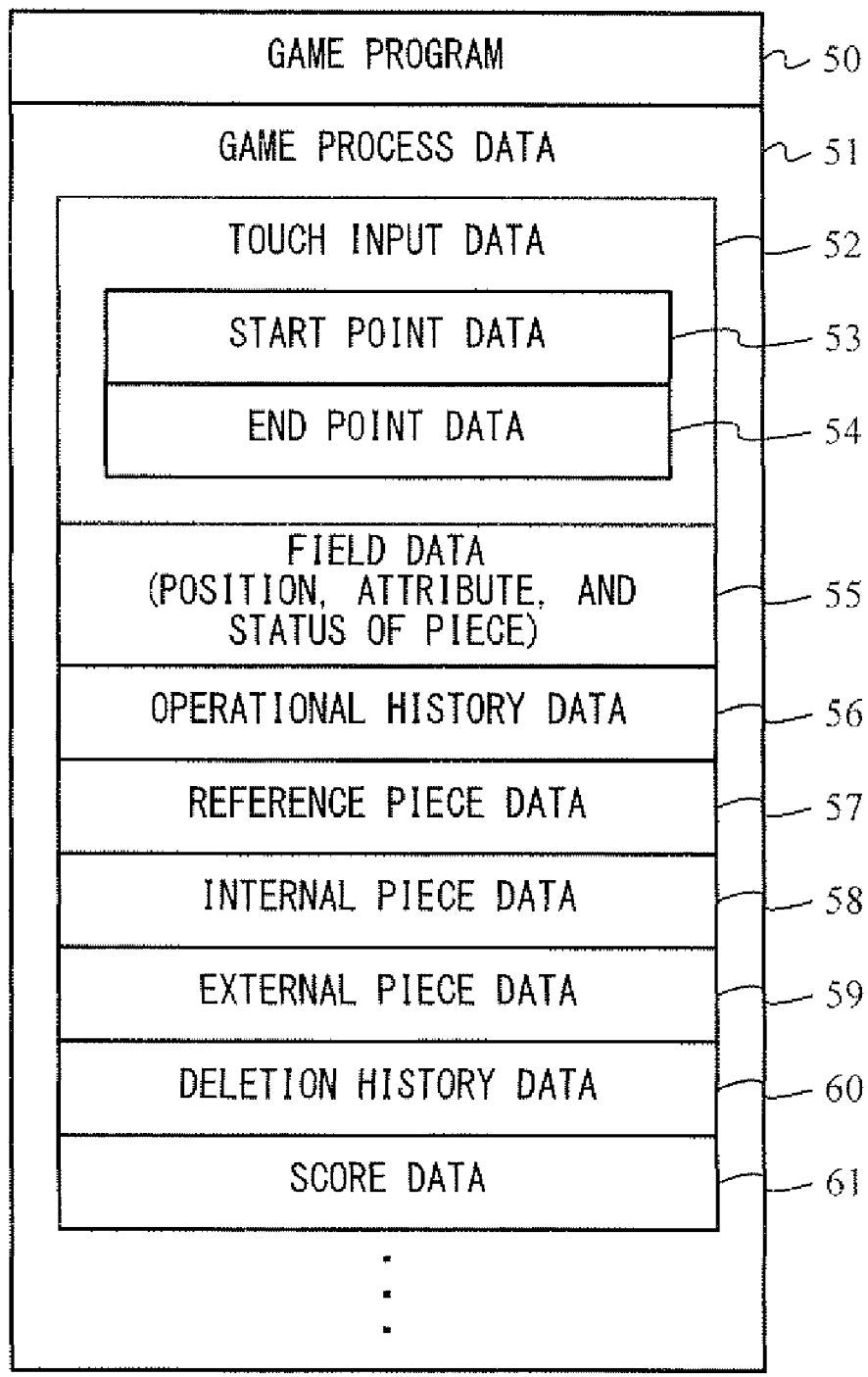
FIG. 7 is a diagram illustrating data stored in a main memory of the game apparatus.

Hereinafter, the game process to be executed by the game program according to the present embodiment will be described in detail with reference to FIGS. 7 to 15. First, various data to be used in the game process will be described. FIG. 7 is a diagram illustrating data stored in the main memory 32 of the game apparatus 1. In FIG. 7, the main memory 32 has stored therein a game program 50 and game process data 51 according to the present embodiment.

Figure 8:
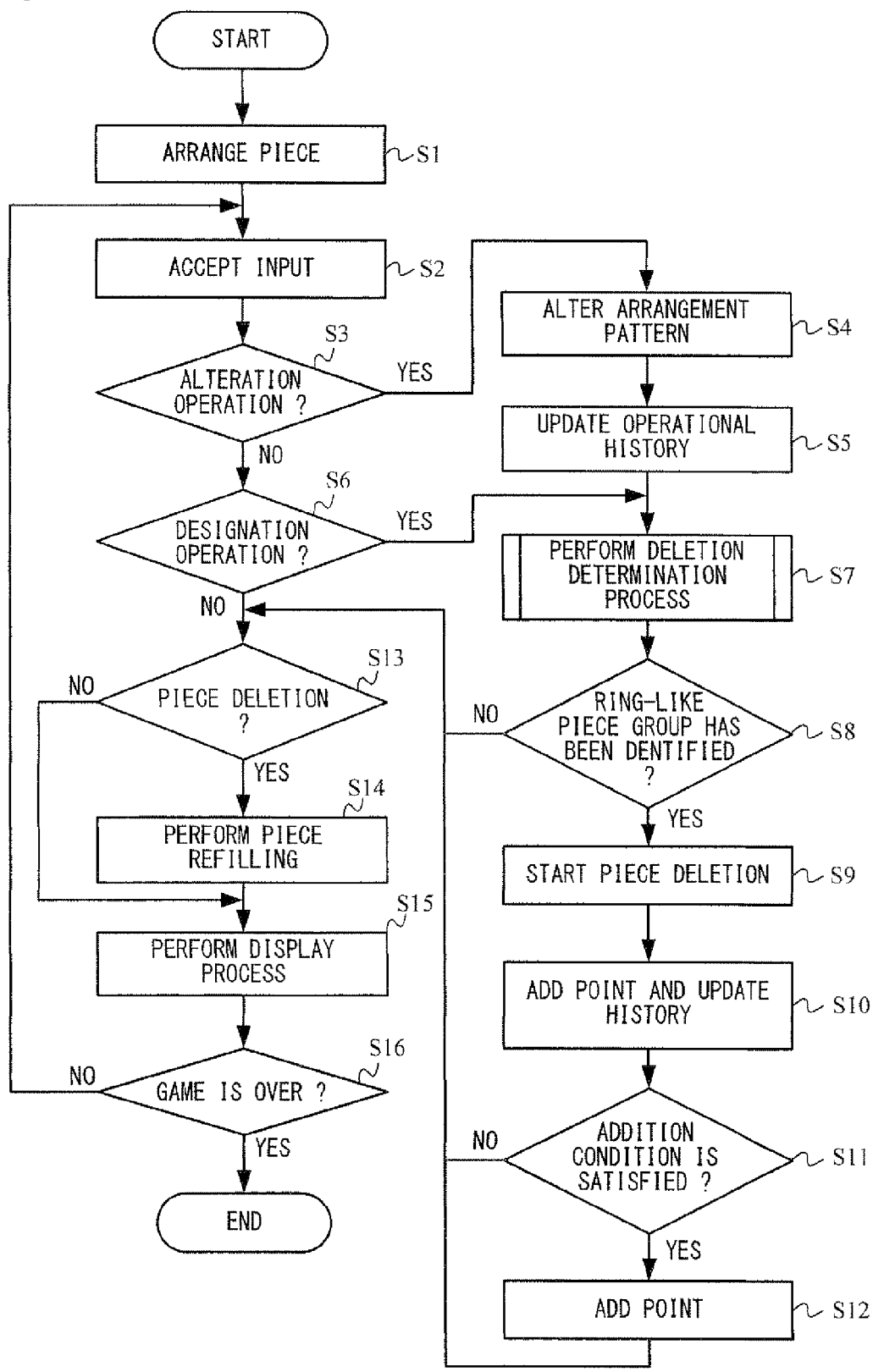
FIG. 8 is a main flowchart illustrating the flow of a game process to be executed in the game apparatus.

The game program 50 is a program for causing the CPU 31 of the game apparatus 1 to execute the game process to be described later (FIG. 8). The game program 50 may be stored to the main memory 32 by being read from the memory card 29 at a suitable time or being acquired via communication with any device external to the game apparatus 1.

The game process data 51 is data to be used in the game process to be described later (FIG. 8). The game process data 51 contains touch input data 52, field data 55, operational history data 56, reference piece data 57, internal piece data 58, external piece data 59, deletion history data 60, and score data 61. Note that the game process data 51 contains data required for the game process, such as image data for various objects (e.g., pieces) appearing in the game, in addition to the data shown in FIG. 7.

The touch input data 52 is data acquired from the touch panel 13 as the touch point data. In the present embodiment, the touch input data 52 contains start point data 53 and end point data 54. The start point data 53 is the first of the touch point data successively acquired from the touch panel 13. The endpoint data 54 is the last of the touch point data successively acquired from the touch panel 13. That is, when the player makes an input to the touch panel 13 to draw a trajectory, data representing the start point of the trajectory is stored to the main memory 32 as the start point data 53, and data representing the end point of the trajectory (the current touch point if the trajectory is being inputted) is stored to the main memory 32 as the end point data 54. The touch input data 52 is used for determining whether the alteration operation and the designation operation have been performed.

The field data 55 represents arrangement of pieces in the field. Concretely, for each piece arranged in the field, the field data 55 contains piece position data representing a position in which the piece is arranged, piece attribute data representing the attribute (color) of the piece, and piece status data representing the status of the piece. Concretely, the piece status data indicates whether or not the piece is being deleted, and, if so, also indicates the remaining time until the piece is completely deleted. In the game apparatus 1, the piece arrangement pattern is determined based on the field data 55.

The operational history data 56 represents a history of alteration operations by the player. In the present embodiment, the operational history data 56 indicates the number of times the alteration operation has been performed since the last piece deletion. As will be described in detail later, in the present puzzle game, when a certain condition (addition condition) is satisfied when deleting the piece, additional points are scored in addition to points to be normally scored by deletion (step S12 to be described later). The operational history data 56 is used for determining whether or not the addition condition is satisfied.

The reference piece data 57, the internal piece data 5S, and the external piece data 59 are used in a deletion determination process to be described later (step S7) in order to identify a ring-like piece group. The reference piece data 57 indicates a piece to be referenced (referred to as a "reference piece") to find a ring-like piece group in the deletion determination process. As will be described in detail later, the reference piece is a piece subjected to the alteration operation or the designation operation.

The internal piece data 58 represents an internal piece group consisting of one or more pieces. Here, the internal piece group is a piece group including, but not limited to, at least one piece arranged inside the ring-like piece group, and the internal piece group may include a piece not arranged inside the ring-like piece group. Concretely, the internal piece group is a piece group including at least one piece that lies around the reference piece and differs in type from the reference piece, and if there are more than one piece in the group, such pieces are adjacently arranged. Also, the external piece data 59 represents a piece group (referred to as an "external piece group") outside the internal piece group.

The deletion history data 60 is data representing the history of piece deletion. Concretely, the deletion history data 60 indicates any region in which piece deletion has ever been performed since the start of the game (referred to as a "deleted region"). As will be described in detail later, the deletion history data 60 is used for determining whether or not the addition condition is satisfied.

The score data 61 indicates the score achieved by the player. In the present embodiment, points are scored in response to piece deletion, and also when the addition condition is satisfied.

Next, the game process to be performed in the game apparatus 1 will be described in detail with reference to FIGS. 8 to 15. FIG. 8 is a main flowchart illustrating the flow of the game process to be executed in the game apparatus 1. When the power button 14F is pressed to turn ON the game apparatus 1, the CPU 31 of the game apparatus 1 initializes the main memory 32 and other elements, and thereafter starts executing the game program 50 for performing the game process shown in FIG. 8.

First, in step S1, the CPU 31 arranges within a field a plurality of pieces with their attributes being set to white or black. Also, the lower LCD 12 is caused to display a game image in which the pieces are arranged in the field. In the present embodiment, 54 pieces are arranged in a rectangular grid with six columns and nine rows as shown in FIG. 3. Note that in another embodiment, the number of pieces to be arranged may be arbitrary and pieces may be arranged in a hexagonal grid. Also, the initial arrangement in step S1 may be predetermined or randomly determined. In step S1, field data 55 indicating the position and attribute of each piece in the initial arrangement is stored to the main memory 32. Note that at this time, piece status data included in the field data 55 for each piece indicates the piece not being deleted. Also, the operational history data 56 indicates "0", the deletion history data 60 indicates no deleted region, and the score data 61 indicates "0". Following step S1, the process of step S2 is executed. Hereinafter, a process loop of steps S2 to S16 is executed once every predetermined period of time (e.g., 1/60 sec.).

In step S2, the CPU 31 accepts an input from a game operation by the player. Concretely, the CPU 31 acquires touch point data from the touch panel 13, and stores the acquired data to the main memory 32 as touch input data 52. Note that when data indicating no input to the touch panel 13 is acquired, the data is not stored to the main memory 32. When the touch point data acquired in step S2 is the first data that has been acquired (when no touch point data was acquired in the previous process loop of steps S2 to S16), the touch point data is stored to the main memory 32 as start point data 53. On the other hand, when the touch point data acquired in step S2 is not the first data that has been acquired (when any touch point data was acquired in the previous process loop of steps S2 to S16), the touch point data is stored to the main memory 32 as end point data 54. As a result, when the player makes any input to the touch panel 13 to draw a trajectory, positions of the start and end points of the trajectory are stored to the main memory 32 as touch input data 52. Following step S2, the process of step S3 is executed.

As described in conjunction with step S2, in the present embodiment, the game apparatus 1 allows the player to perform the alteration operation and the designation operation using the touch panel 13, thereby making it possible for the player to intuitively perform the alteration operation and the designation operation. Note that in another embodiment, the game apparatus 1 may allow the player to perform the alteration operation and the designation operation using the operation button section. For example, the player may perform the alteration operation and the designation operation by moving a cursor displayed on the screen to the position of a desired piece using the direction input button 14A, and selecting the piece with the operation button 14B. Also, in the game apparatus 1, when the touch panel 13 is not used for any game operation, the game image of the field may be displayed on the upper LCD 22.

In step S3, the CPU 31 determines whether or not the player has performed the alteration operation. As described above, the alteration operation in the present embodiment is an operation of drawing a trajectory on the input screen of touch panel 13 (the screen of the lower LCD 12) with its start point being a point on an alteration source piece and its end point being a point on an alteration destination piece (see FIG. 3). The determination as to whether or not the alteration operation has been performed is made based on the touch input data 52 stored in the main memory 32. Concretely, when the player finished the input to the touch panel 13 immediately therebefore, and the point indicated by the start point data 53 and the point indicated by the end point data 54 correspond to different pieces, it is determined that the alteration operation was performed. On the other hand, when it is not immediately after the player's input to the touch panel 13 or when the point indicated by the start point data 53 and the point indicated by the end point data 54 correspond to the same piece, it is determined that the alteration operation was not performed. Note that in the case as referred to by the wording "immediately after the player's input to the touch panel 13", the touch point data was acquired in step S2 during the previous process loop (steps S2 to S16), but no touch point data is acquired in step S2 during the current process loop.

When the determination result of step S3 is affirmative, the process of step S4 is executed. On the other hand, when the determination result of step S3 is negative, the process of step S6 to be described later is executed.

In step S4, the CPU 31 alters the piece arrangement pattern in accordance with the alteration operation. Concretely, the CPU 31 reads the field data 55 stored in the main memory 32, and alters (updates) the field data 55 so as to interchange the attribute (color) of the alteration source piece with the attribute (color) of the alteration destination piece. As a result, in the display process to be described later (step S15), the alteration source piece and the alteration destination piece are displayed with their colors being interchanged with each other. Following step S4, the process of step S5 is executed.

As described above, in the present embodiment, the game apparatus 1 accepts the player's operation (alteration operation) of designating an alteration source piece and an alteration destination piece from among all pieces within the field (steps S2 and S3), and allows the attribute of the alteration destination piece to interchange with the attribute of the alteration source piece, thereby altering the piece arrangement pattern (step S4). Here, the alteration of the arrangement pattern may be performed using any method so long as the piece arrangement pattern is altered as a result of and in accordance with the player's operation. For example, in another embodiment, the game apparatus 1 may be configured such that the attribute of the alteration destination piece is altered to the same attribute as that of the alteration source piece, thereby altering the piece arrangement pattern (the attribute of the alteration source piece remaining unchanged). Also, the alteration operation is not limited to an operation of designating two pieces, i.e., an alteration source piece and an alteration destination piece, and may be an operation of only designating an alteration source piece. For example, the game apparatus 1 may be configured such that a piece may be altered in attribute in response to the piece being touched, such that the attribute changes in a predetermined order.

Also, the arrangement pattern may be altered by altering the attribute of the piece or by moving the piece (by altering the position of the piece). For example, in another embodiment, the CPU 31 may alter the arrangement pattern by interchanging the position of the alteration destination piece with the position of the alteration source piece.

In step S5, the CPU 31 updates the operational history. That is, the operational history data 56 stored in the main memory 32 is updated. As described above, the operational history data 56 indicates the number of times the alteration operation has been performed since the last piece deletion. Accordingly, the operational history data 56 is altered to a pre-update value (number of times) plus 1. Following step S5, the process of step S7 to be described later is executed.

On the other hand, in step S6, the CPU 31 determines whether or not the player has performed the designation operation. The designation operation in the present embodiment is an operation of designating one piece in the field (see FIG. 6). More concretely, the designation operation is an operation of touching a point on a piece to be designated on the input screen of the touch panel 13 and ending the touch input at the same point on the piece. A determination as to whether or not the designation operation has been performed is made based on the touch input data 52 stored in the main memory 32. Concretely, when it is immediately after the player's input to the touch panel 13 and the point indicated by the start point data 53 and the point indicated by the end point data 54 correspond to the same piece, it is determined that the designation operation was performed. On the other hand, when it is not immediately after the player's input to the touch panel 13 or when the point indicated by the start point data 53 and the point indicated by the end point data 54 correspond to different pieces, it is determined that the designation operation was not performed.

When the determination result of step S6 is affirmative, the process of step S7 is executed. On the other hand, when the determination result of step S6 is negative, the process of step S13 to be described later is executed.

As in steps S3 and S6, in the present embodiment, when the alteration operation has been performed (Yes in step S3), or when the designation operation has been performed (Yes in step S6), the deletion determination process is performed in step S7 to be described later, and the identified ring-like piece group is deleted in step S9 to be described later. That is, in the present embodiment, no piece is deleted unless the player performs the alteration operation or the designation operation.

In step S7, the CPU 31 performs the deletion determination process. The deletion determination process is a process of determining whether or not given piece groups satisfy the deletion condition, thereby identifying a ring-like piece group satisfying the deletion condition from among all pieces within the field. Hereinafter, the deletion determination process will be described.

First, the deletion condition to be used for the deletion determination process in the present embodiment will be described. As described above, the deletion condition includes at least a sub-condition that "elements of a ring-like piece group have the same attribute, and be adjacently arranged in a closed ring". In addition to the sub-condition, the deletion condition in the present embodiment includes sub-conditions as follows:

(first sub-condition): one or more pieces (internal piece group) arranged inside the ring-like piece group should be a piece or pieces of one type different from the ring-like piece group; and (second sub-condition): the ring-like piece group should consist of as small a number of pieces as possible to surround the internal piece group.

Figure 9:
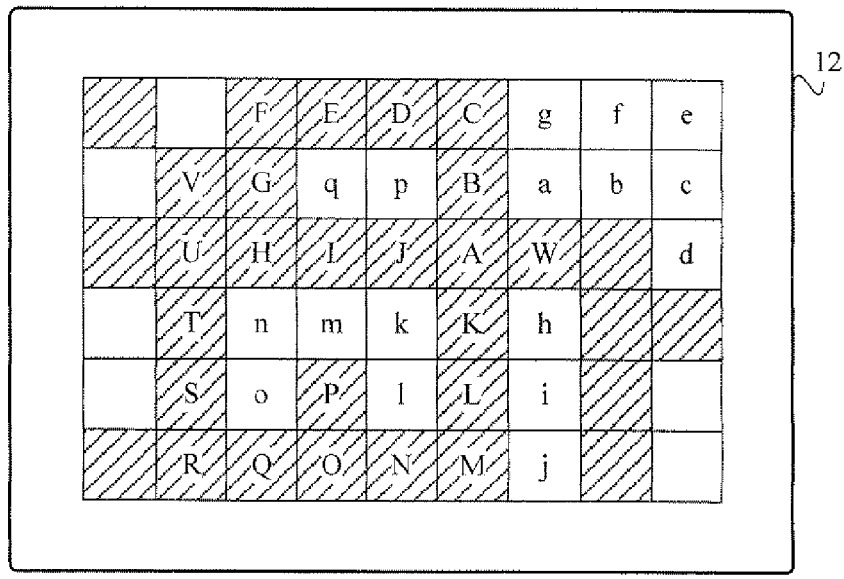
FIG. 9 is a diagram illustrating an exemplary piece arrangement pattern in the embodiment.

Hereinafter, the reasons to include the sub-conditions in the deletion condition will be described with reference to FIG. 9. FIG. 9 is a diagram illustrating an exemplary piece arrangement pattern in the present embodiment. First, the reasons to include the first sub-condition in the deletion condition are to render the game moderately difficult, and facilitate identification of the ring-like piece group. Here, if the first sub-condition is not included in the deletion condition, all adjacent pieces arranged in a closed ring are determined to be in the ring-like piece group. As a result, a number of pieces in the field are determined to be in the ring-like piece group, and furthermore, formation of the ring-like piece group becomes extremely easy for the player. For example, if the player performs an operation such that all pieces arranged in outermost rows and columns within the field are rendered in a single color, all pieces within the field can be deleted. In this case, the deletion condition is extremely permissive, which lowers the difficulty level of the game and thereby spoils the fun of the game. In addition, if the first sub-condition is not included in the deletion condition, two ring-like piece groups might occur. For example, in FIG. 9, two ring-like piece groups: a piece group consisting of pieces A to J; and a piece group consisting of pieces A to H, U, T, S, R, Q, O, N, M, L, and K, are shown (note that there is another ring-like piece group shown in FIG. 9). In this manner, when two ring-like piece groups are present, it is necessary to determine which one of the two ring-like piece groups should be deleted, making it difficult to perform the process of identifying the ring-like piece group to be actually deleted. Supposing that the player selects either of the two ring-like piece groups, the player's operation would be complicated, worsening game operability. For the aforementioned reasons, in the present embodiment, the first sub-condition is included in the deletion condition.

Also, the reason to include the second sub-condition in the deletion condition is to facilitate identification of the ring-like piece group. For example, in FIG. 9, there are two piece groups each identifiable as a ring-like piece group surrounding white pieces p and q, and the piece groups are a group consisting of pieces A to J and a group consisting of pieces A to G, V, U, and H to J. Accordingly, if the second sub-condition is not included in the deletion condition, it is necessary to determine which one of the two ring-like piece groups should be deleted, making it difficult to perform the process of identifying the ring-like piece group to be actually deleted, as in the case of the first sub-condition.

As described above, in the present embodiment, the CPU 31 executes the deletion determination process in accordance with an algorithm to be described below, in order to identify the ring-like piece group that satisfies the deletion condition including the first and second sub-conditions. Hereinafter, the deletion determination process of step S7 will be described in detail with reference to FIG. 10. Note that in order to obtain the piece arrangement in the field, the field data 55 stored in the main memory 32 is read and referenced as necessary in each sub-step of the deletion determination process.

Figure 10:
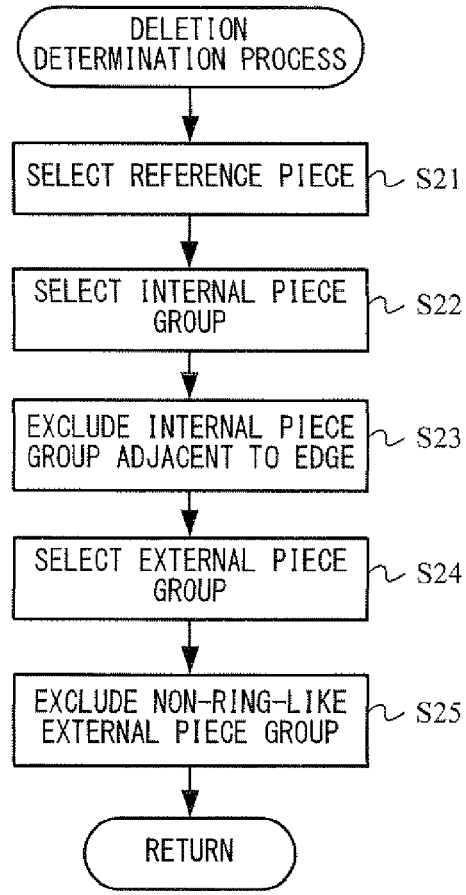
FIG. 10 is a flowchart illustrating the flow of a deletion determination process (step S7) shown in FIG. 8.

FIG. 10 is a flowchart illustrating the flow of the deletion determination process (step S7) shown in FIG. 8. In the deletion determination process, the CPU 31 initially selects a reference piece in step S21. Concretely, a piece designated in the alteration operation as an alteration destination piece or a piece designated in the designation operation is selected as a reference piece. Data representing the selected piece is stored to the main memory 32 as reference piece data 57. Note that in another embodiment, a piece designated in the alteration operation as an alteration source piece, or both the alteration destination piece and the alteration source piece may be set as a reference piece/reference pieces in step S21. Following step S21, the process of step S22 is executed.

Note that the reference piece is a piece to be referenced to find the ring-like piece group in the deletion determination process. As will be described in detail later, in the deletion determination process, the CPU 31 identifies a ring-like piece group that satisfies the deletion condition and includes the reference piece. Accordingly, in the present embodiment, only the ring-like piece group including any piece subjected to the player's operation is actually deleted. On the other hand, any ring-like piece group not subjected to the player's operation is not deleted even if such a group is arranged to satisfy the deletion condition. However, in another embodiment, any ring-like piece group within the field may be identified in the deletion determination process regardless whether the group has been subjected to the player's operation. That is, the processes of steps S21 to S25 may be executed for each piece within the field.

In step S22, the CPU 31 selects an internal piece group. As described above, the internal piece group lies around the reference piece, and is composed of adjacently arranged pieces different in type from the reference piece.

Concretely, the internal piece group is selected in the following manner. Specifically, the CPU 31 initially reads the reference piece data 57 stored in the main memory 32, and identifies a reference piece specified by the reference niece data 57. Thereafter, any piece different in attribute from the reference piece is selected from a piece group only surrounding the reference piece with reference to the field data 55. Here, the "piece group only surrounding the reference piece" is intended to mean a piece group consisting of the eight closest pieces in eight directions vertical, horizontal, or orthogonal with respect to the reference piece. To describe this with reference to the example of FIG. 9, when the reference piece is piece A, pieces a, h, k, and p different in attribute from piece A are selected from pieces (the piece group only surrounding piece A) B, J, K, W, a, h, k, and p closest to piece A in the aforementioned eight directions.

Next, the CPU 31 references the field data 55 to select as the "Internal piece group" an adjacently arranged piece group including selected pieces and being different in attribute from the reference piece. To describe this with reference to the example of FIG. 9, a group of pieces a to g, which includes piece a and is formed by adjacently arranged white pieces (different in attribute from the reference piece), is selected as the internal piece group. Furthermore, as for the other selected pieces h, k, and p, pieces h to j, pieces k to o, and pieces p to q are selected as their respective internal piece groups as in the case of piece a. Thus, in the case of FIG. 9, four internal piece groups are selected.

As described above, in the present embodiment, a piece group arranged around the reference piece (and different in type from the reference piece) is selected as the internal piece group. In step S22, data representing the piece group selected as the internal piece group is stored to the main memory 32 as internal piece data 58. Following step S22, the process of step S23 is executed.

In step S23, the CPU 31 excludes any internal piece group adjacent to the edge of the field from the internal piece group selected in step S22. This is because the internal piece group adjacent to the edge of the field is not surrounded by the reference piece and pieces of the same type as the reference piece, and therefore does not lie inside the ring-like piece group. To describe this with reference to the example of FIG. 9, of the aforementioned four internal piece groups, the internal piece group consisting of pieces a to g and the internal piece group consisting of pieces h to j are excluded in step S23. Concretely, in the process of step S23, the CPU 31 reads the internal piece data 58 from the main memory 32, and deletes data representing the excluded internal piece groups from the internal piece data 58. After the deletion, the internal piece data 58 is stored to the main memory 32.

In step S24, the CPU 31 selects an external piece group based on the internal piece group. Specifically, the field data 55 and the internal piece data 58 stored in the main memory 32 are read, and a niece group specified by the internal piece data 58 being read and only surrounding the internal piece group is selected. Concretely, the selected piece group consists of pieces closest in any of the aforementioned eight directions to any piece included in one internal piece group (pieces surrounding any piece included in one internal piece group) and differing in type from the internal piece group (pieces different in type from the reference piece). Note that the external piece group is selected for each internal piece group, and if a plurality of internal piece groups have been selected before step S24, the external piece group is selected for each of the internal piece groups. To describe this with reference to the example of FIG. 9, when pieces k to o and pieces p to q have been selected as the internal piece groups, a piece group consisting of pieces A, K to U, and H to J is selected as the external piece group corresponding to the internal piece group consisting of pieces k to o, and a piece group consisting of pieces A to J is selected as the external piece group corresponding to the internal piece group consisting of pieces p to q. Note that as is apparent from the example of FIG. 9, some pieces may overlap between mutually different external piece groups (i.e., these groups may include the same pieces). Data representing the selected external piece groups is stored to the main memory 32 as external piece data 59. Following step S24, the process of step S25 is executed.

In step S25, the CPU 31 excludes any piece group not adjacently arranged in a closed ring from the external piece groups selected in step S24. Here, whether or not the pieces included in the external piece group are arranged adjacent to the closed ring can be determined based on whether or not the pieces are adjacent to two or more other pieces included in the external piece group. That is, when any piece included in the external piece group is adjacent to no other piece or only one piece included in the external piece group, the external piece group is not determined to be arranged adjacent to the closed ring. On the other hand, if all the pieces included in the external piece group are adjacent to two or more other pieces included in the external piece group, the external piece group is determined to be arranged adjacent to the closed ring. To describe this with reference to the example of FIG. 9, the piece group consisting of pieces A, K to U, and H to J include piece P, which is only adjacent to piece O, and therefore is not adjacent to two or more pieces included in the piece group. Accordingly, the piece group consisting of pieces A, K to U, and H to J is excluded in step S25. On the other hand, as for the piece group consisting of pieces A to J, all the pieces A to J are adjacent to two or more pieces included in the piece group. Accordingly, the piece group consisting of pieces A to J is not excluded in step S25, and remains as the external piece group.

Concretely, in the process of step S25, the CPU 31 reads the external piece data 59 from the main memory 32, and deletes data representing the excluded external piece group from the external piece data 59. After the deletion, the external piece data 59 is stored to the main memory 32. The piece group (in the example of FIG. 9, the piece group consisting of pieces A to J) represented by the external piece data 59 stored in the main memory 32 at this time is a piece group to be identified as the ring-like piece group. After the process of step S25, the CPU 31 completes the deletion determination process.

Note that in another embodiment, the CPU 31 may not necessarily execute the process of step S23. Even if any internal piece group adjacent to the edge of the field is not excluded in step S23, any external piece group adjacent to such an internal piece group is excluded in the process of step S25.

As described above, in the present embodiment, the ring-like piece group is identified by the deletion determination process. The identified ring-like piece group is then deleted by the process of step S9 to be executed thereafter. Here, in the deletion determination process of the game apparatus 1, an internal piece group is initially selected (steps S22 and 23), and pieces adjacent to the internal piece group are selected to be included in an external piece group (steps S24 and S25). At this time, the external piece group is composed of a minimum number of pieces surrounding the internal piece group. That is, the internal piece group is surrounded by a smallest possible number of pieces. Accordingly, in the present embodiment, the external piece group can be selected so as to satisfy the second sub-condition, making it possible to readily identify a ring-like piece group satisfying the second sub-condition.

Figure 11:
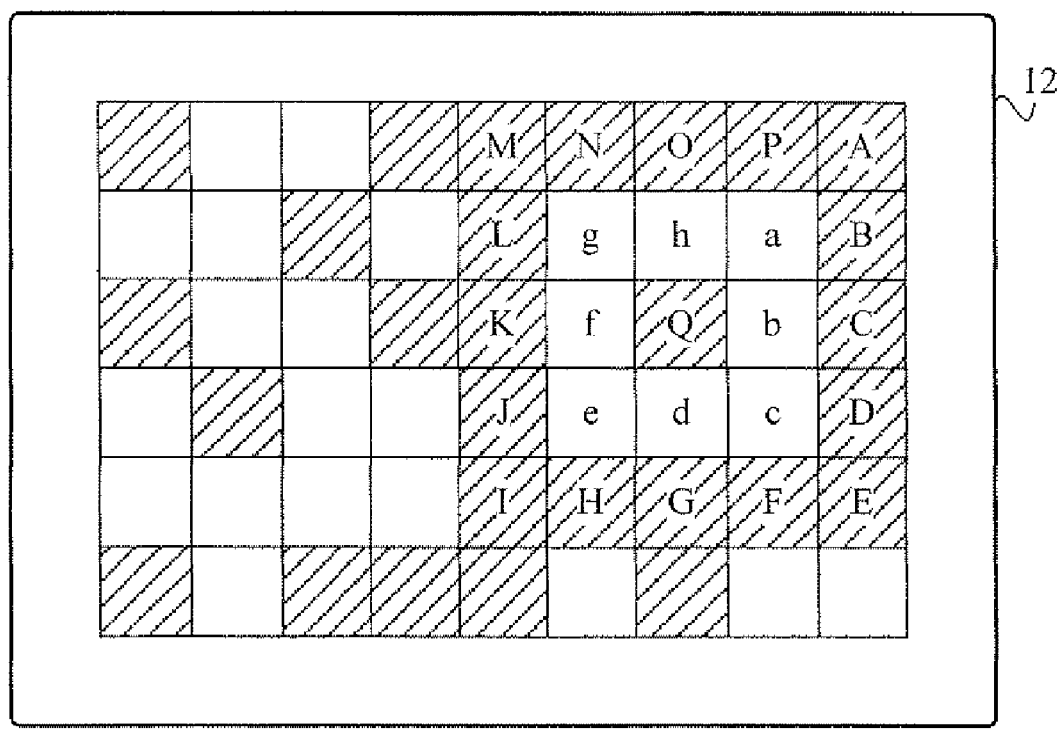
FIG. 11 is a diagram illustrating an exemplary game image including an arrangement pattern that does not satisfy a deletion condition.

Also, in the deletion determination process of the game apparatus 1, any pieces adjacent to the internal piece group are selected to be included in an external piece group (step S24), and a-ring-like piece group is identified on the premise that pieces included in the external piece group are adjacently arranged in a closed ring within the predetermine area (step S25). Here, for example, the piece arrangement pattern shown in FIG. 11 is considered. FIG. 11 is a diagram illustrating an exemplary game image including an arrangement pattern that does not satisfy the deletion condition. In FIG. 11, for example, when piece A is a reference piece, pieces a to h are selected to be included in an internal piece group in steps S22 and S23. As a result, in step S24, pieces A to Q are selected to be included in an external piece group. Here, pieces A to Q are not adjacently arranged in a closed ring within the predetermine area (piece Q is not adjacent to other pieces A to P included in the external piece group), and therefore pieces A to Q are excluded in step S25. In this manner, in the deletion determination process, when the first sub-condition is not satisfied, e.g., when a piece (piece Q) of the same type as a piece group (pieces A to P) adjacently arranged in a closed ring within the predetermine area is positioned inside the piece group, the piece group is not deleted. Specifically, in the deletion determination process, the external piece group can be selected so as to satisfy the first sub-condition, making it possible to readily identify a ring-like piece group satisfying the first sub-condition.

Also, in the deletion determination process, no matter what attribute the reference piece has, the ring-like piece group is identified. Specifically, in the deletion determination process of the game apparatus 1, whether or not any ring-like piece group satisfies the deletion condition is determined for pieces of plural attributes. Accordingly, in the present embodiment, it is possible to delete a piece if the piece is a black piece surrounded by white pieces or a white piece surrounded by black pieces. The player plays the game considering whether pieces of each type should be external (frame) or internal. As described above, in the present embodiment, variations on the puzzle element deletion method are increased, which renders the game more strategic, making it possible to provide a puzzle game which is more fun.

Also, in the case where the alteration operation is performed (Yes in step S3), in the deletion determination process, a piece subjected to the alteration operation is set as a reference piece (step S21), and a ring-like piece group including the reference piece is identified (steps S22 to S25). Specifically, in the deletion determination process of the game apparatus 1 according to the present embodiment, when a piece arrangement pattern is altered, a ring-like piece group to be identified includes a piece having its position or attribute altered in accordance with the alteration of the piece arrangement pattern and satisfying the deletion condition. When the ring-like piece group is identified in the deletion determination process, step S9 to be described later is executed, deleting the identified ring-like piece group. Accordingly, in the present embodiment, when the player performs the alteration operation to create an arrangement pattern satisfying the deletion condition, the identified ring-like piece group is deleted without performing any further operation. Thus, the player can play the game with satisfactory operability.

Also, in the case where the designation operation was performed (Yes in step S6), in the deletion determination process, a piece subjected to the designation operation is set as a reference piece (step S21), and a ring-like piece group including the reference piece is identified (steps S22 to S25). Specifically, in the deletion determination process of the game apparatus 1 according to the present embodiment, a piece is designated, and a piece group including the designated piece and satisfying the deletion condition is identified. When the ring-like piece group is identified in the deletion determination process, step S9 to be described later is executed, deleting the identified ring-like piece group. As described above, in the present embodiment, even if, for example, the process of step S1 or S14 results in a ring-like piece group originally satisfying the deletion condition, the ring-like piece group is not deleted without any operation, and therefore the player designates a piece included in the ring-like piece group, thereby deleting the ring-like piece group (FIG. 6). That is, the player finds and designates a ring-like puzzle element group satisfying the deletion condition within the field, so that the player can play the puzzle game in a more enjoyable manner than conventionally.

Note that in the present embodiment, a ring-like piece group satisfying the deletion condition is directly designated by the designation operation, thereby identifying the ring-like piece group as an identified ring-like piece group, but in another embodiment, a piece inside a ring-like piece group satisfying the deletion condition may be designated by the designation operation, thereby identifying the ring-like piece group as an identified ring-like piece group. Specifically, in the deletion determination process of the game apparatus 1, the designation operation may be accepted to designate a piece, and correspondingly, a ring-like piece group satisfying the deletion condition and having the designated piece located inside the ring-like piece group may be identified.

Note that in the deletion determination process of the game apparatus 1, a ring-like piece group is identified by an algorithm in which a reference piece is initially selected (step S21), an internal piece group is then selected (steps S22 and S23), and an external piece group is finally selected (steps S24 and S25). Here, another algorithm conceivable for identifying the ring-like piece group including the reference piece is an algorithm in which the reference piece is used as a starting point in finding a string of pieces of the same type as the reference piece. In the game apparatus 1 according to another embodiment, such an algorithm may be used to identify the ring-like piece group. In the game apparatus 1 employing this algorithm, a piece string to be found consists of pieces of the same type as the reference piece and extending from the reference piece. Furthermore, by determining whether or not the piece string is formed in a closed ring, as well as whether or not any piece of the same type is located inside the piece string, it is possible to identify a ring-like piece group. Note that in the algorithm of finding the piece string, the number of piece strings to be found increases depending on the piece arrangement pattern, which might result in an increased processing load or a complicated process of determining the second sub-condition. On the other hand, the algorithm used for the aforementioned determination process makes it possible to identify the ring-like piece group with a simplified process.

Referring back to FIG. 8, in step S8, following step S7, the CPU 31 determines whether or not any ring-like piece group has been identified. The determination of step S8 can be made based on the external piece data 59 stored in the main memory 32. Specifically, when the external piece data 59 specifies one or more piece groups, any ring-like piece group satisfying the deletion condition can be determined to be identified. On the other hand, when the external piece data 59 specifies no piece group, any ring-like piece group satisfying the deletion condition is determined to be not identified. When the determination result of step S8 is affirmative, the process of step S9 is executed. On the other hand, when the determination result of step S8 is negative, the process of step S13 to be described later is executed.

In step S9, the CPU 31 starts piece group deletion. In the present embodiment, the piece group deletion starts in step S9, and completes in a predetermined period of time (e.g., about several seconds). Specifically, a piece group to be deleted is completely deleted after the predetermined period of time since the start of deletion in step S9. Here, in the present embodiment, the "piece group to be deleted" includes a ring-like piece group (identified ring-like piece group) identified in step S7 and any piece located inside the ring-like piece group. Concretely, in step S9, as for the piece group to be deleted, piece status data contained in the field data 55 stored in the main memory 32 is altered so as to indicate the remaining time (the aforementioned predetermined period time) for deletion. Note that as for any piece being deleted at the time of step S9 (any piece for which unupdated piece status data indicates the remaining time), the piece status data may or may not be updated. Updating the piece status data for any piece being deleted so as to indicate the predetermined period of time means extension of the remaining time before the piece is completely deleted. Following step S9, the process of step S10 is executed.

Note that in step S9, pieces to be deleted by setting an identified ring-like piece group include the identified ring-like piece group and any piece surrounded thereby. Here, pieces to be deleted may be in positions determined by the identified ring-like piece group set in step S7. That is, the pieces to be deleted can be uniquely determined based on the position of the identified ring-like piece group. For example, in the game apparatus 1 according to another embodiment, only the identified ring-like piece group may be deleted or only a piece group arranged inside the identified ring-like piece group may be deleted (i.e., the identified ring-like piece group is not deleted). Note that in the case where the identified ring-like piece group is not deleted, the ring-like piece group satisfying the deletion condition remains, which unexpectedly facilitates the next piece deletion. Therefore, the game apparatus 1 is preferably configured such that at least the ring-like piece group is deleted in step S9.

Also, when a plurality of identified ring-like piece groups are set in step S7, pieces to be deleted are determined in step S9 based on the identified ring-like piece groups. Specifically, when a plurality of identified ring-like piece groups are set, each identified ring-like piece group and any piece surrounded by the identified ring-like piece group are targeted for deletion. At this time, a second addition condition to be described later is satisfied.

In step S10, the CPU 31 adds points in accordance with piece deletion, and updates various history data (operational history data 56 and deletion history data 60). Specifically, in a point addition process, score data 61 stored in the main memory 32 is initially read, and predetermined points are added to the score indicated by the score data 61. Data indicating the score after the addition is stored to the main memory 32 as an update to the score data 61. Note that in another embodiment, the CPU 31 may alter the points to be added in accordance with the number of pieces deleted in step S9 or in accordance with the shape of the piece group deleted in step S9 (e.g., if the piece group forms a cross, more points than normal are added).

In step S10, the CPU 31 then reads and updates the deletion history data 60 stored in the main memory 32. As described above, the deletion history data 60 indicates a deleted region within the entire field. Accordingly, in step S10, the deletion history data 60 is updated such that the area of the identified ring-like piece group deleted in step S9 of the current process loop (steps S2 to S16) is added to the deleted region indicated by the unupdated deletion history data 60. Next, the CPU 31 resets the value of the operational history data 56. Specifically, the value indicated by the operational history data 56 is updated to "0". Following step S10, the process of step S11 is executed.

In step S11, the CPU 31 determines whether or not any of the aforementioned addition conditions is satisfied. Here, in the present embodiment, four addition conditions are set. Specifically, the main memory 32 has data representing the first to fourth addition conditions stored therein so as to be correlated with data for points to be added when the conditions are satisfied, and the CPU 31 reads the data to perform the determination of step S11. Hereinafter, each addition condition will be described in detail.

Figure 12:
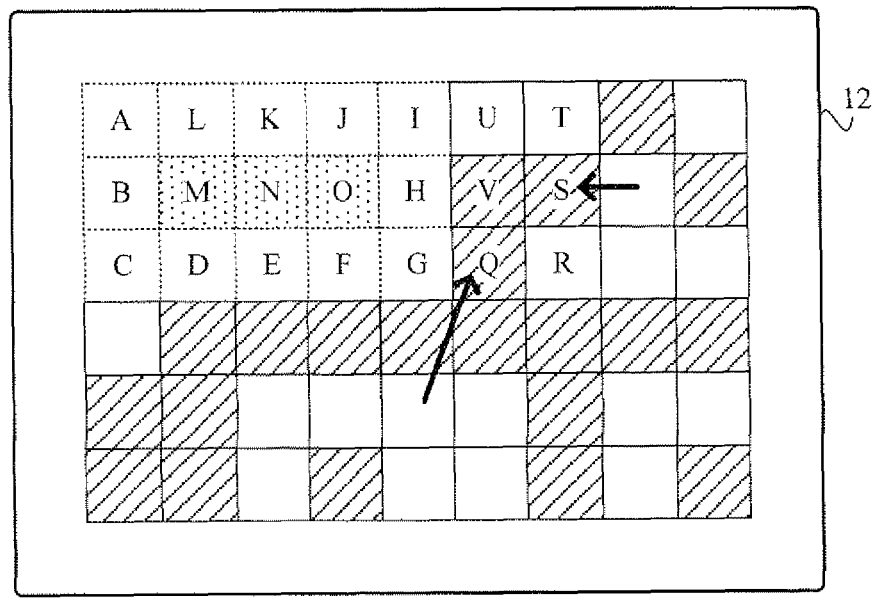
FIG. 12 is a diagram illustrating a game image immediately before a first addition condition is satisfied.
Figure 13:
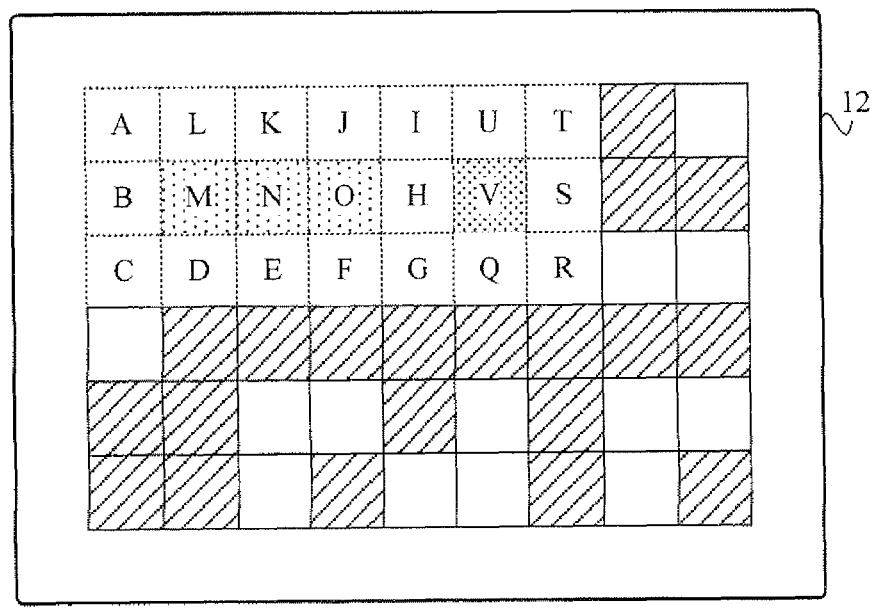
FIG. 13 is a diagram illustrating a game image where the first addition condition is satisfied.

The first addition condition will now be described. The first addition condition is that an identified ring-like piece group determined to be deleted in step S9 should include a part of another identified ring-like piece group being deleted. Specifically, before an identified ring-like piece group is deleted (while an identified ring-like piece group is being deleted), if another ring-like piece group is identified, which includes a part of the identified ring-like piece group being deleted and satisfies the deletion condition, the first addition condition is satisfied. The following will be described with reference to the examples of FIGS. 12 and 13. FIG. 12 is a diagram illustrating a game image immediately before the first addition condition is satisfied, and FIG. 13 is a diagram illustrating a game image where the first addition condition is satisfied. In FIG. 12, pieces A to O are being deleted. In the state shown in FIG. 12, when the alteration operation is performed to alter pieces Q and S in attribute (see the arrows shown in FIG. 12), a piece group consisting of pieces G to I and Q to U, which therefore includes pieces G to I being deleted, newly satisfies the deletion condition, as shown in FIG. 13. As a result, a group of pieces A to O and a group of pieces G to I and Q to V are deleted. In this case, the first addition condition is satisfied, and more points than normal are added (i.e., compared to the case where the identified ring-like piece group does not include any part of the other identified ring-like piece group being deleted). Note that it is possible to allow the first addition condition to be successively satisfied (e.g., in FIG. 13, an additional ring-like piece group including pieces R to T is further created), and therefore the points to be added may be altered in accordance with the number of times the first addition condition is successively satisfied.

Here, in conventional puzzle games, a technique called "chain reaction" is used to achieve a higher score. With the "chain reaction" technique, deletion of a piece causes another piece to, for example, fall, thereby altering the piece arrangement pattern, which results in a piece satisfying the deletion condition thereby to be deleted. On the other hand, in the present embodiment, if refilling with pieces results in a ring-like piece group satisfying the deletion condition, the ring-like piece group is not deleted without the player's operation, and therefore the conventional "chain reaction" technique is not available.

Accordingly, in the present embodiment, a technique for successively deleting piece groups (different from the conventional "chain reaction" technique) is rendered available by taking advantage of a unique feature of the present invention that "(because a piece group formed in a ring satisfies the deletion condition) allows a part of the ring-like piece group to be used as a part of another ring-like piece group". Specifically, in the technique available for successively deleting piece groups, a certain period of time is taken to delete a piece group (step S9), making it possible to create a new ring-like piece group using a part of the ring-like piece group being deleted. Furthermore, by setting the first addition condition, it becomes possible to score more points by successively deleting piece groups. As described above, in the present embodiment, the technique for successively deleting piece groups makes it possible to score more points, thereby rendering the game more fun.

Whether or not the first addition condition is satisfied can be determined based on whether or not any piece included in the ring-like piece group is being deleted when deletion of the group is started in step S9 of the current process loop of steps S2 to S16. Note that whether or not any piece is being deleted can be obtained by reading and referencing piece status data included in the field data 55.

Figure 14:
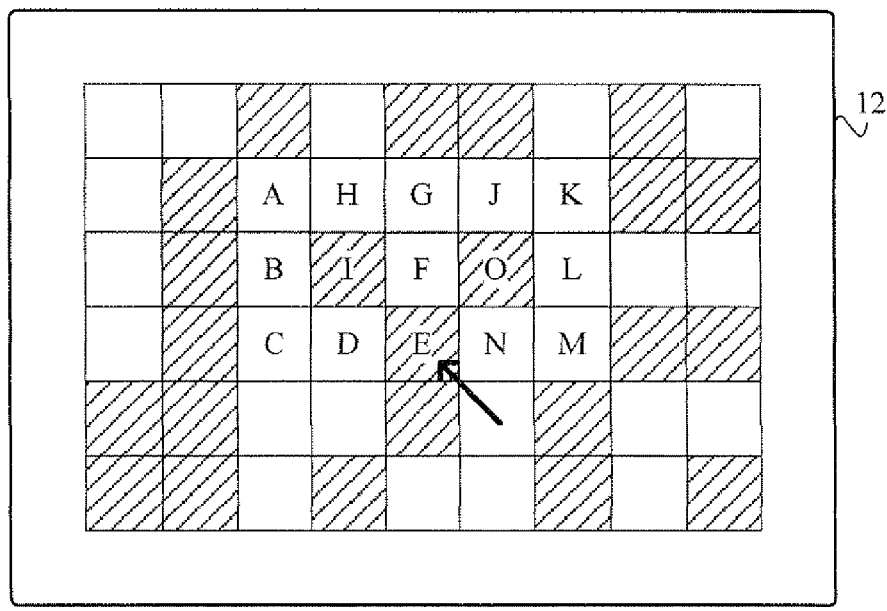
FIG. 14 is a diagram illustrating a game image immediately before a second addition condition is satisfied.
Figure 15:
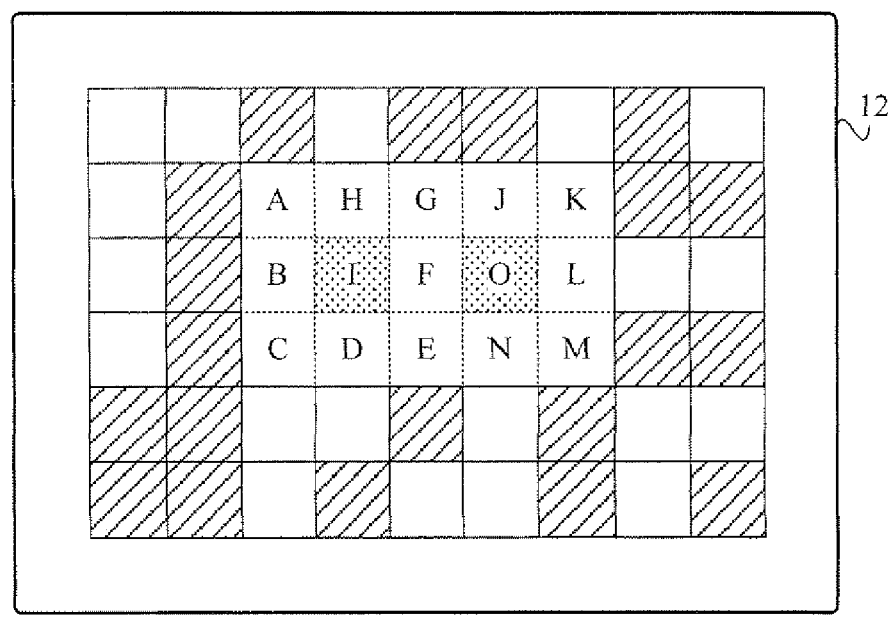
FIG. 15 is a diagram illustrating a game image where the second addition condition is satisfied.

The second addition condition will be described next. FIG. 14 is a diagram illustrating a game image immediately before the second addition condition is satisfied, and FIG. 15 is a diagram illustrating a game image where the second addition condition is satisfied. In FIG. 14, if the attribute of piece E is altered to white (see the arrow shown in FIG. 14), two piece groups, one consisting of pieces A to H and the other consisting of pieces E to G and J to N, satisfy the deletion condition, as shown in FIG. 15. As a result, these two piece groups are simultaneously deleted. The second addition condition is to simultaneously delete two or more ring-like piece groups. Accordingly, when two or more ring-like piece groups are simultaneously deleted, more points than normal are added (compared to the case where two ring-like piece groups are deleted one by one). Note that in the example described in conjunction with FIGS. 14 and 15, two ring-like piece groups are simultaneously deleted by the alteration operation, but two ring-like piece groups can be simultaneously deleted as well by the designation operation. For example, in the case where the initial arrangement pattern is as shown in FIG. 15, when the designation operation is performed to designate any of the pieces E to G, the two ring-like piece groups can be simultaneously deleted. Note that three or four ring-like piece groups can be simultaneously deleted, and points to be added may be altered in accordance with the number of ring-like piece groups to be simultaneously deleted.

By setting the second addition condition, it becomes possible to achieve different game effects between the case where only one ring-like piece group is deleted and the case where a plurality of ring-like piece groups are simultaneously deleted. As a result, the player is required to delete as many ring-like piece groups as possible by one operation, which renders the game more strategic. Thus, by setting the second addition condition, it becomes possible to provide a puzzle game which is more fun.

Whether or not the second addition condition has been satisfied can be determined based on whether or not two or more identified ring-like piece groups have been deleted in step S9 of the current process loop of steps S2 to S16. Specifically, the external piece data 59 is read to determine whether the external piece data 59 specifies two or more piece groups.

Also, a third addition condition is to create a ring-like piece group satisfying the deletion condition by the first alteration operation from the last piece deletion (or from the initial arrangement). When the third addition condition is satisfied, more points than normal are added (compared to the case where the deletion condition is satisfied by two or more alteration operations). Note that in the present embodiment, points are added when the alteration operation is performed once between two consecutive attempts at piece deletion, but in another embodiment, points to be added may be altered in accordance with the number of times the alteration operation is performed.

By setting the third addition condition, it becomes possible to achieve different game effects depending on the number of operations required for piece deletion. As a result, the player is required to perform game operations considering the number of operations to be performed for piece deletion, which renders the game more strategic. Thus, by setting the third addition condition, it becomes possible to provide a puzzle game which is more fun.

Whether or not the third addition condition is satisfied can be determined by reading and referencing the operational history data 56. Specifically, when the operational history data 56 indicates "1", it is determined that the third addition condition is satisfied. On the other hand, when the operational history data 56 indicates "2", it is determined that the third addition condition is satisfied.

Also, the fourth addition condition is to delete pieces in the entire field. Note that the fourth addition condition differs from the second addition condition in that pieces in the entire field do not have to be deleted by a single operation, and may be deleted by a predetermined number of operations after the start of the game (the number of operations may be limited). When the fourth addition condition is satisfied, additional points are scored along with points scored by deleting a ring-like piece group. Note that in the present embodiment, the fourth addition condition requires pieces to be deleted from the entire field, but in another embodiment, the fourth addition condition may require pieces to be deleted at a predetermined ratio (e.g., 80% of the entire field) or may require a predetermined shape to be formed by deleted pieces.

By setting the fourth addition condition, the player is required to perform game operations considering regions in which piece deletion has been performed, which renders the game more strategic. Thus, by setting the fourth addition condition, it becomes possible to provide a puzzle game which is more fun.

Whether or not the fourth addition condition is satisfied can be determined by reading and referencing the deletion history data 60. Specifically, when the deletion history data 60 indicates the entire field, it is determined that the fourth addition condition is satisfied. On the other hand, when the deletion history data 60 only indicates apart of the field, it is determined that the fourth addition condition is not satisfied.

Note that in another embodiment, for example, the following addition conditions may be set in addition to (or instead of) the first to fourth addition conditions.

while an identified ring-like piece group is being deleted, another ring-like piece group further be created (unlike the first addition condition, these two ring-like piece groups should not overlap).

pieces of only one type, i.e., white or black, be arranged on the field.

all pieces arranged on the field be deleted.

In step S11, a determination is made for each of the first to fourth addition conditions, regarding whether or not the condition is satisfied. However, in the case where piece deletion is performed by the designation operation, the determination for the third addition condition is not made in step S11. When the determination of step S11 finds that at least one of the first to fourth addition conditions is satisfied, the determination result of step S11 is affirmative, so that the process of step S12 is executed. On the other hand, when the determination finds that none of the first to fourth addition conditions is satisfied, the determination of step S11 is negative, so that the process of step S13 to be described later is executed.

In step S12, the CPU 31 adds points in accordance with any of the first to fourth addition conditions determined to be satisfied in step S11. Specifically, the score data 61 stored in the main memory 32 is read, and points corresponding to the condition determined to be satisfied in step S11 are added to the score indicated by the score data 61. Then, data indicating the score after the addition is stored to the main memory 32 as an update to the score data 61. Following step S12, the process of step S13 is executed.

In the present embodiment, by performing piece deletion by a particular method satisfying the addition condition as in step S12, it becomes possible to achieve a higher score than by a typical method not satisfying the addition condition. Thus, it is possible to provide a puzzle game which is more strategic and fun.

Note that in the present embodiment, when the addition condition is satisfied, points are added, but in another embodiment, the effect on the game (game effect) achieved by satisfying the addition condition is not limited to point addition, and may be arbitrary. Specifically, in the game apparatus 1, the content of the game effect may be arbitrary so long as the game effect achieved when the addition condition is satisfied differs from that achieved when the addition condition is not satisfied. For example, when the addition condition is satisfied, the time limit of the game in step S16 may be extended (so that the game can be played for a longer period of time), or an item advantageous in the game may be obtained.

In step S13, the CPU 31 determines whether or not any piece being deleted should be completely deleted. First, the CPU 31 subtracts a predetermined period of time (a period of time equivalent to a single process loop of steps S2 to S16) from the remaining time for the piece being deleted. Specifically, the field data 55 is read from the main memory 32, and piece status data for the piece being deleted is updated to a value obtained through the subtraction of the predetermined period of time. Next, the CPU 31 determines whether there is any piece for which the value indicated by the updated piece status data is 1 or less. When such a piece is present, the determination result of step S13 is affirmative, so that the process of step S14 is executed. On the other hand, when such a piece is absent, the determination result of step S13 is negative, so that the process of step S15 is executed after skipping the process of step S14.

In step S14, the CPU 31 performs piece refilling in positions from which pieces have been (completely) deleted in step S13. Specifically, the CPU 31 reads the field data 55 from the main memory 32, and updates piece attribute data and piece status data for the pieces corresponding to the positions in which piece deletion has been performed in step S13. Here, the piece status data is updated so as to indicate the piece is not being deleted. Also, the piece attribute data is randomly set and updated to either white or black. That is, in the present embodiment, the attribute of a piece for refilling is randomly determined. Note that in another embodiment, the attribute of a piece for refilling may be determined in accordance with a predetermined rule. For example, the CPU 31 may cause plural types (in the present embodiment, two types) of pieces to be used for a refill in step S14 (in order not to use pieces of only one type for refilling). Following step S14, the process of step S15 is executed.

Note that the game apparatus 1 is configured such that, in step S14, a new piece refills any position from which a piece has been deleted, but in another embodiment, when any piece is deleted, piece refilling may be performed after intra-field piece movement. Specifically, in the game apparatus 1, when piece deletion results in a piece that is not adjacent to another piece in a predetermined direction, the piece is moved in the predetermined direction to the end of the field or until it is placed adjacent to another piece. After the piece movement, a new piece refills a part of the field where no piece is present. For example, to describe this with reference to the example of FIG. 6, when pieces A to I shown in FIG. 6 are deleted, three pieces arranged above pieces A, G, and H may be moved downward to the positions of pieces C to E. After the three pieces are moved, positions above the three moved pieces may be refilled with new pieces.

In step S15, the CPU 31 performs a display process. Concretely, the field data 55 is read, and a plurality of pieces are displayed on the screen of the lower LCD 12 in accordance with piece arrangement specified by the field data 55. Note that for each piece being deleted, the CPU 31 may display the piece in, for example, a translucent, flashing, or colored manner, allowing the player to visually distinguish it from pieces not being deleted. Although not shown, the score and game playing time (or time limit) may be displayed on the screen of the lower LCD 12 (or the upper LCD 22), along with the field in which the pieces are arranged. Following step S15, the process of step S16 is executed.

in step S16, the CPU 31 determines whether or not to end the game. Concretely, a determination is made regarding whether or not the time limit has elapsed since the start of the game. Note that the determination as to whether or not to end the game may be made based on, for example, whether or not the game has been cleared, the game is over, or the player has provided an instruction to stop the game. When the determination result of step S16 is negative, the process of step S2 is executed again. After this, the process loop of steps S2 to S16 will be repeatedly executed until it is determined in step S16 that the game is to be ended. On the other hand, when the determination result of step S16 is affirmative, the CPU 31 completes the game process shown in FIG. 8. This concludes the description of the game process.

As described above, in the game process according to the present embodiment, the player can loop pieces of one type, thereby deleting the pieces. In this manner, by employing an unprecedented and more complicated deletion condition, game strategy can be improved, thereby making it possible to provide a puzzle game which is more fun.

[Variants]

Note that the puzzle game in the above embodiment is illustrative, and various modifications can be made thereto. Hereinafter, variants of the embodiment will be described.

(Variants on the Piece Type)

In the above embodiment, pieces are classified into two types, i.e., white and black, but in another embodiment, the pieces may be of one type or of three types or more. When there are pieces of only one type, the game apparatus 1 may be configured such that, for example, pieces are arranged in a part of the field (i.e., no piece is arranged in some part of the field). In this case also, pieces can be deleted based on the deletion condition that a piece group be adjacently arranged in a closed ring (no piece is arranged inside the ring).

Note that in the case where pieces are arranged in a part of the field (the pieces may be of more than one type), the game apparatus 1 may be configured such that a piece moving operation is accepted. For example, in the game apparatus 1, an operation of designating a direction in the field is accepted. Once the operation is accepted, pieces are moved in the designated direction. Note that only a specific piece designated by the player may be moved, or all pieces movable in the designated direction may be moved. Here, the "pieces movable in the designated direction" refer to those excluding pieces not movable in the designated direction because another piece is present in the direction or they are arranged at the edge of the field.

Also, when there are pieces of three types or more, the game apparatus 1 is configured such that, as in the above embodiment, pieces can be deleted based on the deletion condition that a piece group be adjacently arranged in a closed ring. Note that when there are pieces of three types or more, pieces of more than one type might be arranged inside the piece group adjacently arranged in a closed ring. Accordingly, in this case, the deletion condition may additionally include a sub-condition that "pieces of the same type as the ring-like piece group should not be arranged inside the ring-like piece group" or "pieces of a type different from the ring-like piece group be arranged inside the ring-like piece group". When the former sub-condition is employed, the game apparatus 1 may be configured such that the internal piece group condition in step S22 may additionally include a sub-condition that "the internal piece group should consist of pieces different in type from the reference piece". Also, when the latter condition is employed, the game apparatus 1 may be configured such that the internal piece group condition in step S22 may additionally include a sub-condition that "the internal piece group should consist of pieces of a type different from the reference piece (or the internal piece group be only adjacent to pieces of the same type as the reference piece"). Furthermore, the external piece group condition in step S24 may additionally include a sub-condition that "the external piece group should consist of pieces of the same type as the reference piece".

Also, the above embodiment has been described with respect to the case where pieces may be different only in color in accordance with their attributes, but in another embodiment, pieces may be different in size or deletion condition in accordance with their attributes. For example, a piece twice the size of other pieces (twice both in length and width) may be arranged in the field, or a piece that is not deleted unless it is surrounded twice in total by a piece group adjacently arranged in a closed ring may be provided. Also, a piece that is not deleted unless it is surrounded by a piece group of a predetermined type may be provided. In this manner, by arranging pieces having characteristics in, for example, size or deletion condition, other than visual characteristics, it becomes possible to render the game more strategic.

(Variants on the Game Rule)

The above embodiment has been described taking as an example a puzzle game with the goal of deleting as many pieces arranged in the field as possible within a predetermined time limit, but the rule of the puzzle game is not limited to this. For example, in the embodiment, piece refilling is performed when pieces are deleted, but in another embodiment, the puzzle game to be played with the game apparatus 1 may be a puzzle game in which, for example, piece refilling is performed by pieces falling into the field at regular time intervals. In this puzzle game, when pieces are piled up to fill the field, it is determined that the game is over, and therefore the player deletes pieces in the field so as not to fill the field with pieces. Also, in another embodiment, the puzzle game to be played with the game apparatus 1 may be a puzzle game in which piece refilling is not performed, but instead, the field displayed on the screen is scrolled. In this puzzle game, the field displayed on the screen is scrolled to display new pieces when pieces in the field are deleted so that the number of remaining pieces is reduced to a predetermined number or less. The player can play the game with the aim of scrolling the field to the finish line by deleting pieces, or competitively scrolling the field the longest distance within a predetermined period of time.

Also, the above embodiment has been described taking as an example a game to be played by one player at a timer but the present invention is applicable to games to be played by more than one player at a time. For example, in the puzzle game in which piece refilling is performed by pieces falling into the field, pieces may fall into the field for a player in accordance with the number of pieces deleted by another player, thereby realizing a multiplayer type game. Also, players may be caused to take turns to perform one operation, such as the alteration operation or the designation operation, at a time, thereby realizing a multiplayer type game.

Also, the above embodiment has been described with respect to the puzzle game with the goal of deleting a piece group arranged in positions determined by an identified ring-like piece group, but in another embodiment, the attribute of each piece included in the piece group may be altered, rather than the piece group being deleted. For example, in the game apparatus 1, the identified ring-like piece group and each piece surrounded thereby may be altered in attribute. Furthermore, the attribute may be altered to another attribute in a random manner or in accordance with a predetermined algorithm. Also, in the game apparatus 1, points may be added in accordance with the alteration of piece attribute by creating an identified ring-like piece group. As described above, in another embodiment, the game apparatus 1 may be configured such that some point evaluation within the game is performed by identifying a ring-like piece group.

Thus, the present embodiment aims to, for example, provide a puzzle game which is more strategic and fun, and is applicable to, for example, game programs and game apparatuses for executing a puzzle game.

While the example embodiment presented herein has been described in detail, the foregoing description is in all aspects illustrative and not restrictive. It is understood that numerous other modifications and variations can be devised without departing from the scope of the embodiment.

What is claimed is:

1. A non-transitory computer-readable storage medium having stored therein a game program to be executed by a computer in a game apparatus, the program causing the computer to perform at least:
    puzzle element arrangement for arranging a plurality of puzzle elements within a predetermined area on a screen of a display device, the elements each having a preset attribute;
    arrangement alteration for altering a puzzle element arrangement pattern within the predetermined area in accordance with a player's operation;
    ring-like puzzle element identification for identifying a ring-like puzzle element group consisting of puzzle elements having the same preset attribute and being adjacently arranged in a closed ring; and
    puzzle element deletion for deleting any puzzle element arranged in a position determined by the identified ring-like puzzle element group defined by the ring-like puzzle element identification.

2. The non-transitory storage medium according to claim 1, wherein
    the ring-like puzzle element identification defines as the identified ring-like puzzle element group any ring-like puzzle element group satisfying a condition that any puzzle element of the same attribute as the ring-like puzzle element group should not be arranged inside the ring-like puzzle element group.

3. The non-transitory storage medium according to claim 2, wherein,
    the puzzle element arrangement arranges puzzle elements of plural attributes within the predetermined area, and
    the ring-like puzzle element identification defines as the identified ring-like puzzle element group any ring-like puzzle element group satisfying a condition that puzzle elements of only one attribute different from the ring-like puzzle element group be arranged inside the ring-like puzzle element group.

4. The non-transitory storage medium according to claim 2, wherein
    the ring-like puzzle element identification defines as the identified ring-like puzzle element group any ring-like puzzle element group further satisfying a sub-condition that the ring-like puzzle element group should consist of as small a number of puzzle elements as possible to surround one or more puzzle elements arranged inside the ring-like puzzle element group.

5. The non-transitory storage medium according to claim 2, wherein the ring-like puzzle element identification includes:
    reference selection for selecting a puzzle element within the predetermined area as a reference puzzle element;
    internal puzzle element selection for selecting any puzzle element of an attribute different from the reference puzzle element from among a puzzle element group only surrounding the reference puzzle element, and further selecting as an internal puzzle element group any puzzle element group including the selected puzzle element and consisting of adjacently arranged puzzle elements of an attribute different from the reference puzzle element; and external puzzle element selection for selecting as an external puzzle element group any puzzle element group only surrounding the internal puzzle element group, and defining as the identified ring-like puzzle element group any external puzzle element group consisting of puzzle elements adjacently arranged in a closed ring.

6. The non-transitory storage medium according to claim 1, wherein, the puzzle element arrangement arranges at least first and second attribute puzzle elements within the predetermined area, and for both the first and second attribute puzzle elements, the ring-like puzzle element identification determines whether or not the puzzle elements are arranged to form their respective identified ring-like puzzle element groups.

7. The non-transitory storage medium according to claim 6, wherein based on a condition that only puzzle elements of an attribute different from the ring-like puzzle element group be arranged inside the ring-like puzzle element group, the ring-like puzzle element identification determines as the identified ring-like puzzle element groups both a first attribute ring-like puzzle element group arranged to surround only the second attribute puzzle elements and a second ring-like puzzle element group arranged to surround only the first attribute puzzle elements.

8. The non-transitory storage medium according to claim 6, wherein, the game program causes the computer to perform such that the player's operation is repeatedly accepted, and the arrangement alteration alters the puzzle element arrangement pattern within the predetermined area upon each operation by the player, thereby progressing a game, and the arrangement alteration is capable of altering the arrangement pattern upon each operation by the player, for both the first and second attribute puzzle elements.

9. The non-transitory storage medium according to claim 1, wherein the puzzle element deletion deletes both the identified ring-like puzzle element group defined by the ring-like puzzle element identification and any puzzle element arranged inside the identified ring-like puzzle element group.

10. The non-transitory storage medium according to claim 1, wherein the puzzle element deletion deletes only the identified ring-like puzzle element group defined by the ring-like puzzle element identification.

11. The non-transitory storage medium according to claim 1, wherein, the puzzle element arrangement arranges puzzle elements of plural attributes within the predetermined area;

the game program causes the computer to further alteration acceptance for accepting the player's operation of designating an alteration source puzzle element and an alteration destination puzzle element from among the puzzle elements within the predetermined area, and the arrangement alteration alters the alteration destination puzzle element so as to have the same attribute as the alteration source puzzle element, thereby altering the puzzle element arrangement pattern.

12. The non-transitory storage medium according to claim 11, wherein the arrangement alteration causes the alteration destination puzzle element to interchange in attribute with the alteration source puzzle element, thereby altering the puzzle element arrangement pattern.

13. The non-transitory storage medium according to claim 1, wherein, the game program causes the computer to further perform direction acceptance for accepting the player's operation of designating a direction within the predetermined area, and the arrangement alteration moves one or more puzzle elements in the direction designated by the player's operation, thereby altering the puzzle element arrangement pattern.

14. The non-transitory storage medium according to claim 1, wherein the ring-like puzzle element identification identifies a ring-like puzzle element group including any puzzle element having its position or attribute altered by the arrangement alteration altering the arrangement pattern.

15. The non-transitory storage medium according to claim 14, wherein the ring-like puzzle element identification defines a plurality of identified ring-like puzzle element groups, and the puzzle element deletion deletes puzzle elements arranged in positions respectively determined by the identified ring-like puzzle element groups.

16. The non-transitory storage medium according to claim 1, wherein, the game program causes the computer to further perform designation acceptance for accepting the player's operation of designating a puzzle element within the predetermined area, and the ring-like puzzle element identification identifies a ring-like puzzle element group including the designated puzzle element when the designation acceptance accepts the player's operation of designating the puzzle element.

17. The non-transitory storage medium according to claim 16, wherein the ring-like puzzle element identification defines a plurality of identified ring-like puzzle element groups, and the puzzle element deletion deletes puzzle elements arranged in positions respectively determined by the identified ring-like puzzle element groups.

18. The non-transitory storage medium according to claim 1, wherein, the game program causes the computer to further perform designation acceptance for accepting the player's operation of designating a puzzle element within the predetermined area, and the ring-like puzzle element identification defines as the identified ring-like puzzle element group a ring-like puzzle element group surrounding the designated puzzle element when the designation acceptance accepts the player's operation of designating the puzzle element.

19. The non-transitory storage medium according to claim 1, wherein the program causes the computer to further perform puzzle element refilling for refilling a puzzle element in a position from which a puzzle element has been deleted by the puzzle element deletion.

20. The non-transitory storage medium according to claim 19, wherein the puzzle element refilling refills at least two types of puzzle elements per refill.

21. The non-transitory storage medium according to claim 1, wherein the game program causes the computer to further perform:
puzzle element movement for moving a puzzle element in a predetermined direction to an end of the predetermined area or until the puzzle element is placed adjacent to another puzzle element, the puzzle element to be moved being rendered out of contact with another puzzle element in the predetermined direction through puzzle element deletion by the puzzle element deletion; and
puzzle element refilling for refilling a puzzle element in a region where no puzzle element is present after the movement by the puzzle element movement.

22. The non-transitory storage medium according to claim 21, wherein
the puzzle element refilling refills at least two types of puzzle elements per refill.

23. The non-transitory storage medium according to claim 1, wherein,
the puzzle element deletion deletes a puzzle element group after a lapse of a predetermined period of time since deletion of the puzzle element group was determined; and
when the ring-like puzzle element identification defines as the identified ring-like puzzle element group another ring-like puzzle element group including a part of the puzzle element group being deleted before the puzzle element group is completely deleted, the puzzle element deletion further deletes any puzzle element arranged in a position determined by the identified ring-like puzzle element group.

24. The non-transitory storage medium according to claim 23, wherein
the game program causes the computer to further perform first effect achievement for achieving a game effect by deleting a puzzle element group, the game effect being achieved differently based on whether or not the puzzle element group includes a part of another puzzle element group being deleted.

25. The non-transitory storage medium according to claim 1, wherein
the game program causes the computer to further perform second effect achievement for achieving a game effect variously in accordance with the number of puzzle elements to be deleted by the puzzle element deletion.

26. The non-transitory storage medium according to claim 1, wherein
the game program causes the computer to further perform third effect achievement for achieving a game effect variously in accordance with the number of predetermined player operations to be performed between two consecutive attempts at puzzle element deletion.

27. The non-transitory storage medium according to claim 1, wherein
the game program causes the computer to further perform:
region memory for keeping in memory of the game apparatus any region of the predetermined area from which any puzzle element has been deleted after a predetermined time point; and
fourth effect achievement for achieving a predetermined game effect when the region kept in the memory satisfies a predetermined condition.

28. The non-transitory storage medium according to claim 1, wherein,
the game apparatus includes an input device for allowing designation of an arbitrary position on the screen, and
the arrangement alteration alters the puzzle element arrangement pattern in accordance with the player's operation performed on the input device.

29. A non-transitory computer-readable storage medium having stored therein a game program to be executed by a computer in a game apparatus, the program causing the computer to perform at least:
puzzle element arrangement for arranging a plurality of puzzle elements within a predetermined area on a screen of a display device, the elements each having a preset attribute;
arrangement alteration for altering a puzzle element arrangement pattern within the predetermined area in accordance with a player's operation;
ring-like puzzle element identification for identifying a ring-like puzzle element group consisting of puzzle elements having the same preset attribute and being adjacently arranged in a closed ring; and
puzzle element alteration for altering the attribute of any puzzle element arranged in a position determined by the identified ring-like puzzle element group defined by the ring-like puzzle element identification.

30. A game apparatus comprising:
a puzzle element arrangement unit for arranging a plurality of puzzle elements within a predetermined area on a screen of a display device, the elements each having a preset attribute;
an arrangement alteration unit for altering a puzzle element arrangement pattern within the predetermined area in accordance with a player's operation;
a ring-like puzzle element identification unit for identifying a ring-like puzzle element group consisting of puzzle elements having the same preset attribute and being adjacently arranged in a closed ring; and
a puzzle element deletion unit for deleting any puzzle element arranged in a position determined by the identified ring-like puzzle element group defined by the ring-like puzzle element identification unit.

31. A method for arranging, using a computer system having at least one computer processor, a plurality of puzzle elements, the method comprising:
arranging the plurality of puzzle elements within a predetermined area on a screen of a display device, the elements each having a preset attribute;
altering a puzzle element arrangement pattern within the predetermined area in accordance with a player's operation;
identifying a ring-like puzzle element group consisting of puzzle elements having the same preset attribute and being adjacently arranged in a closed ring; and
deleting any puzzle element arranged in a position determined by the identified ring-like puzzle element group defined by the ring-like puzzle element identification.

* * * * *